(12) United States Patent
Kikuchi

(10) Patent No.: US 6,477,632 B1
(45) Date of Patent: Nov. 5, 2002

(54) STORAGE DEVICE AND ACCESSING METHOD

(75) Inventor: Shuichi Kikuchi, Iwate (JP)

(73) Assignee: Tokyo Electron Device Limited, Yokohama (JP)

(*) Notice: Subject to any disclaimer, the term of this patent is extended or adjusted under 35 U.S.C. 154(b) by 0 days.

(21) Appl. No.: 09/319,621

(22) PCT Filed: Dec. 2, 1998

(86) PCT No.: PCT/JP98/05441

§ 371 (c)(1),
(2), (4) Date: Jul. 28, 1999

(87) PCT Pub. No.: WO99/30239

PCT Pub. Date: Jun. 17, 1999

(30) Foreign Application Priority Data

Dec. 5, 1997 (JP) .............................................. 9-335596

(51) Int. Cl.⁷ .............................................. G06F 12/00
(52) U.S. Cl. .................. 711/203; 711/203; 365/185.29; 365/185.33
(58) Field of Search ........................... 711/203, 5, 103; 365/185.33, 185.24, 230.03; 707/100

(56) References Cited

U.S. PATENT DOCUMENTS

| | | | | |
|---|---|---|---|---|
| 5,388,248 A | * | 2/1995 | Robinson et al. | 365/52 |
| 5,524,230 A | * | 6/1996 | Sakaue et al. | 711/103 |
| 5,611,067 A | | 3/1997 | Okamoto et al. | 711/103 |
| 5,761,702 A | * | 6/1998 | Matsufuji | 711/103 |
| 5,978,808 A | * | 11/1999 | Wells et al. | 707/100 |
| 5,987,573 A | * | 11/1999 | Hiraka | 711/156 |

FOREIGN PATENT DOCUMENTS

| | | |
|---|---|---|
| JP | 6-187205 | 7/1994 |
| JP | 7-134674 | 5/1995 |
| JP | 8-249225 | 9/1996 |
| WO | WO 94/20906 | 9/1994 |
| WO | WO 95/10083 | 4/1995 |

OTHER PUBLICATIONS

IBM Technical Disclosure Bulletin, US, IBM Corp. New York, "Linked List Search Table Array For Free Storage Blocks" vol. 3, No. 8, (Jan. 1, 1991) pp. 474–479.

* cited by examiner

*Primary Examiner*—Do Hyun Yoo
*Assistant Examiner*—Nasser Moazzami
(74) *Attorney, Agent, or Firm*—Luce, Forward, Hamilton & Scripps LLP

(57) ABSTRACT

In order to access a memory cell array (1), an address translation table which stores a correspondence between logical and physical addresses, and an empty block table which specifies locations of empty blocks, are stored in an arbitrary block of the memory cell array (1) itself. In the case of reading data from the memory cell array (1), a physical address to read data is attained with reference to the address translation table stored in the memory cell array (1). Meanwhile, in the case of writing data, an empty block is detected from the empty block table stored in the memory cell array (1), and data is written in the empty block. Moreover, the address translation table and the empty block table which have been updated are written in another empty block.

27 Claims, 13 Drawing Sheets

US 6,477,632 B1

STORAGE DEVICE AND ACCESSING METHOD

TECHNICAL FIELD

This invention relates to a storage device and an accessing method, and particularly to a block erase type storage device and an accessing method for the same.

BACKGROUND ART

A block erase type storage device is known which comprises a block erase type storage medium such as a flash memory, and which reads and writes information under the control of a central processing unit (CPU) and a dedicated controller.

The block erase type storage medium indicates such a storage medium that the storage contents of a writing target area need to be erased in advance in order to write data therein and an erasing process can be performed only in units (generally called blocks) equal to or larger than the smallest unit (generally called a page, a segment or the like) of the storage capacity dealt in a writing process.

In order to manage an external access, the block erase type storage device comprises an SRAM (Static Random Access Memory) or the like which stores an empty block table in which information representing the locations of empty blocks is stored and an address translation table in which information showing the correspondence between logical and physical addresses is stored.

Upon reception of a write request, the block erase type storage device finds an empty block registered in the empty block table, writes data in the found block, adds the correspondence between the physical and logical addresses of the block to the address translation table, and furthermore, erases the block from the empty block table.

Moreover, upon reception of a read request, the block erase type storage device searches the address translation table while using the logical address of to-be-read data as a key, discriminates the physical address of the location at which the to-be-read data has been stored, and reads the data from that location.

In to such a storage device, the volume of the entire storage device increases according to the volume occupied by the SRAM. Due to this, such a storage device when used for purposes which require a small volume as in the case of a JEIDA/PCMCIA card, etc., needs a volume suppressing idea.

Furthermore, the SRAM consumes a large amount of power, and if the SRAM is used to store a variety of tables, the amount of power consumed by the entire storage device increases, entailing a drawback of the storage device becoming unsuitable for being applied to purposes which require low power consumption as in the case of a JEIDA/PCMCIA card, etc.

DISCLOSURE OF INVENTION

This invention has been made in consideration of the above-described circumstances, and an object thereof is to provide a block erase type storage device of a small volume and low power consumption and an accessing method for the same.

A storage device according to the first aspect of this invention having the above object is characterized by comprising:

storage means (1), including a plurality of memory blocks to which physical addresses have been assigned;

erasure means (1e) for batch erasing of stored data from the storage means in units of memory blocks; and writing means (4X, 4B, 5, 20), to which data and logical addresses are input, for determining locations where the data is to be stored in the storage means and for writing the data in the locations;

wherein the storage means stores an address translation table which stores information showing a correspondence between the logical addresses and physical addresses of the storage means, and the writing means comprises means (4X, 4B, 5, 20) for adding, to the address translation table, information showing a correspondence between physical addresses of the locations where the data has been written and the input logical addresses, or for updating the address translation table.

According to the storage device having this structure, the address translation table is stored in the storage means which is a block erase type storage medium. Therefore, a storage medium such as an SRAM or the like for storing the address translation table is not required in addition to the aforementioned storage means. This ensures a block erase type storage device whose volume is relatively small and whose power consumption is low.

The above-described storage device may further comprise reading means (4X, 4B, 5, 20) including:

means (20) for storing a physical address of a block in which the address translation table has been written;

physical address reading means (4X, 4B, 5, 20) for accessing the block which contains the address translation table stored therein and for reading physical addresses corresponding to logical addresses of to-be-read data; and means (4X, 4B, 5, 20) for reading and outputting data stored at the physical addresses read by the physical address reading means.

Using this reading means, the physical addresses of the to-be-read data can be detected and read from the address translation table stored in the storage means.

The aforementioned storage means can store an empty block table which stores information specifying empty blocks containing no data stored therein.

By employing this structure, the used amount of memory such as an SRAM or the like, utilized in addition to the storage means, can be further reduced to promote a reduction in the volume and power consumption.

The empty block table which stores information specifying the empty block that has been existed until the data has been stored in the empty block is eliminated, and the empty block table which stores information specifying empty blocks that remain after the empty block writing means has written the data in the empty block is stored in the storage means. By so doing, information on the empty blocks contained in the empty block table is updated so that the up-to-date empty block information can be attained at any time.

The aforementioned storage means may comprise a plurality of chips or flash memories, for example. In this case, the address translation table (and the empty block table) may be stored in an arbitrary block of any one of the chips or flash memories. And means may be provided for storing information showing in which block of which chip the address translation table and the empty block table have been stored.

The storage means stores the address translation table and the empty block table in one block.

According to this structure, the number of blocks for storing the address translation table and the empty block table can be minimized to one, and the storage capacity of the storage means can be used with efficiency. Moreover, the management of the locations at which those tables have been stored becomes easy.

Further, a storage device according to the second aspect of this invention is characterized by comprising:

storage means (1), including a plurality of memory blocks to which physical addresses have been assigned;

erasure means (1e) for batch erasing of stored data from the storage means in units of memory blocks; and writing means (4X, 4B, 5, 20), to which to-be-written data and logical addresses are input, for determining locations where the data is to be stored in the storage means and for writing the data in the locations;

wherein the storage means stores empty block information specifying empty blocks in which the data is not stored, and the writing means writes the data in an empty block specified by the empty block information.

According to this structure, the empty block information is stored in the storage means which is a block erase type storage medium. Therefore, a storage medium such as an SRAM or the like for storing the empty block information is not required in addition to the aforementioned storage means. This ensures a block erase type storage device whose volume is relatively small and whose power consumption is low.

If the writing means further comprises updating means (1e, 4X, 4B, 5, 20) for changing the empty block information stored in the storage means to the empty block information which specifies information on empty blocks that remain after the writing means has written the data in the empty block, the empty block information is updated so that the up-to-date empty block information can be attained at any time.

The empty block information may be stored in a portion of each empty block, and includes chain information registered to specify another empty block in a chain manner. In this case, the writing means may comprise means (4X, 4B, 5, 20) for detecting an empty block in accordance with the chain information and for writing the data in the empty block.

According to this structure, one block need not be used to store the empty block table, and the efficiency of use of the storage medium is high. Moreover, since a writing target block is specified based on the chain information on empty blocks, the frequency of use of each block is uniformized.

When the empty block information includes the chain information, top empty block storing means (20), etc. may be provided for storing an address of a first empty block; data may be written in the empty block assigned the physical address stored in the top empty block storing means; and the contents of the top empty block storing means can be updated by the chain information registered in the block in which the data has been written.

In the case where the storing means comprises a flash memory or the like, its storage area comprises data areas and redundant areas. In this case, the chain information can be stored in the redundant areas.

In such a storage device, the chain information is written in the redundant areas of the empty blocks, and the aforementioned data is overwritten in the empty blocks in which the chain information has already been written.

In this case, the data areas and the redundant areas are arranged so as not to overlap each other in the aforementioned storage area, thereby preventing the chain information from being destroyed due to the overwriting of the aforementioned data.

Similarly in the storage device according to the second embodiment, the storage means may comprise a plurality of chips or flash memories, for example. In this case, the chain information may include information showing in which block of which chip the next block has been stored.

An accessing method according to the third aspect of this invention is a method for accessing a memory of a block erase type in which data can be erased in units of blocks and data can be written in empty blocks from which data has been erased in advance, and the method is characterized by comprising steps of:

causing the memory itself to store an address translation table which stores information showing a correspondence between physical addresses assigned to the memory and logical addresses of data;

at a time of supply of to-be-written data and their logical addresses, making a determination based on the address translation table as to whether data has already been written at the logical addresses, and when it is determined that data exists at the logical addresses, detecting the empty blocks, writing the data in the empty blocks and erasing blocks containing old data, while when it is determined that no data exists at the logical addresses, detecting the empty blocks, writing the data in the empty blocks, and thereafter;

adding information showing a correspondence between physical addresses of the blocks in which the data has been written and the logical addresses to the address translation table in the memory, or updating the information; and at a time of supply of logical addresses of to-be-read data, accessing the address translation table in the memory, detecting physical addresses of locations where the data has been written, reading the data from the physical addresses, and outputting the data.

An accessing method according to the fourth aspect of this invention is a method for accessing a memory of a block erase type in which data can be erased in units of blocks and data can be written in empty blocks from which data has been erased in advance, and the method is characterized by comprising steps of:

causing the memory to store an empty block table specifying the empty blocks;

at a time of supply of to-be-written data, detecting an empty block on the basis of the empty block table in the memory, and writing the data in the detected empty block.

With the accessing methods according to the third and fourth aspects, parts of the memory can be used as the address translation table and the empty block table, and another memory such as an SRAM or the like for storing those tables need not be arranged, which contributes toward a reduction in the capacity and power consumption.

An accessing method according to the fifth aspect of this invention is a method for accessing a memory of a block erase type in which data can be erased in units of blocks and data can be written in empty blocks from which data has been erased in advance, and the method is characterized by comprising steps of:

causing a block which the memory comprises to store empty block information specifying the empty blocks of the memory;

at a time of supply of to-be-written data, detecting an empty block on the basis of the empty block information, writing the data in the detected empty block, newly detecting an empty block on the basis of the empty block information, erasing storage contents of the block in which the empty block information has been stored, and writing updated empty block information in the newly detected empty block.

With the accessing method according to the fifth aspect, not only parts of the memory can be used as the address translation table and the empty block table in order to achieve a reduction in the volume and power consumption, but also the empty block information can be updated so that the latest empty block information can be attained at any time.

An accessing method according to the sixth aspect of this invention is a method for accessing a memory of a block erase type in which data can be erased in units of blocks and data can be written in empty blocks from which data has been erased in advance, and the method is characterized by comprising steps of:

storing, in a portion of each empty block of the memory, empty block chain information which includes information that sequentially specifies another empty block; and at a time of supply of to-be-written data, detecting a top empty block in an empty block chain defined by the empty block chain information, and writing the data in the detected empty block.

With the accessing method according to the sixth aspect, a part of the memory can be used as the empty block table. Furthermore, since the empty blocks in which data is to be written are in the order of the chain defined by the chain information, the writing frequency can be uniformized over the entirety of the memory.

BEST MODE FOR CARRYING OUT THE INVENTION

Storage devices according to the best modes for carrying out this invention will now be explained.

(First Embodiment)

Figure 1:
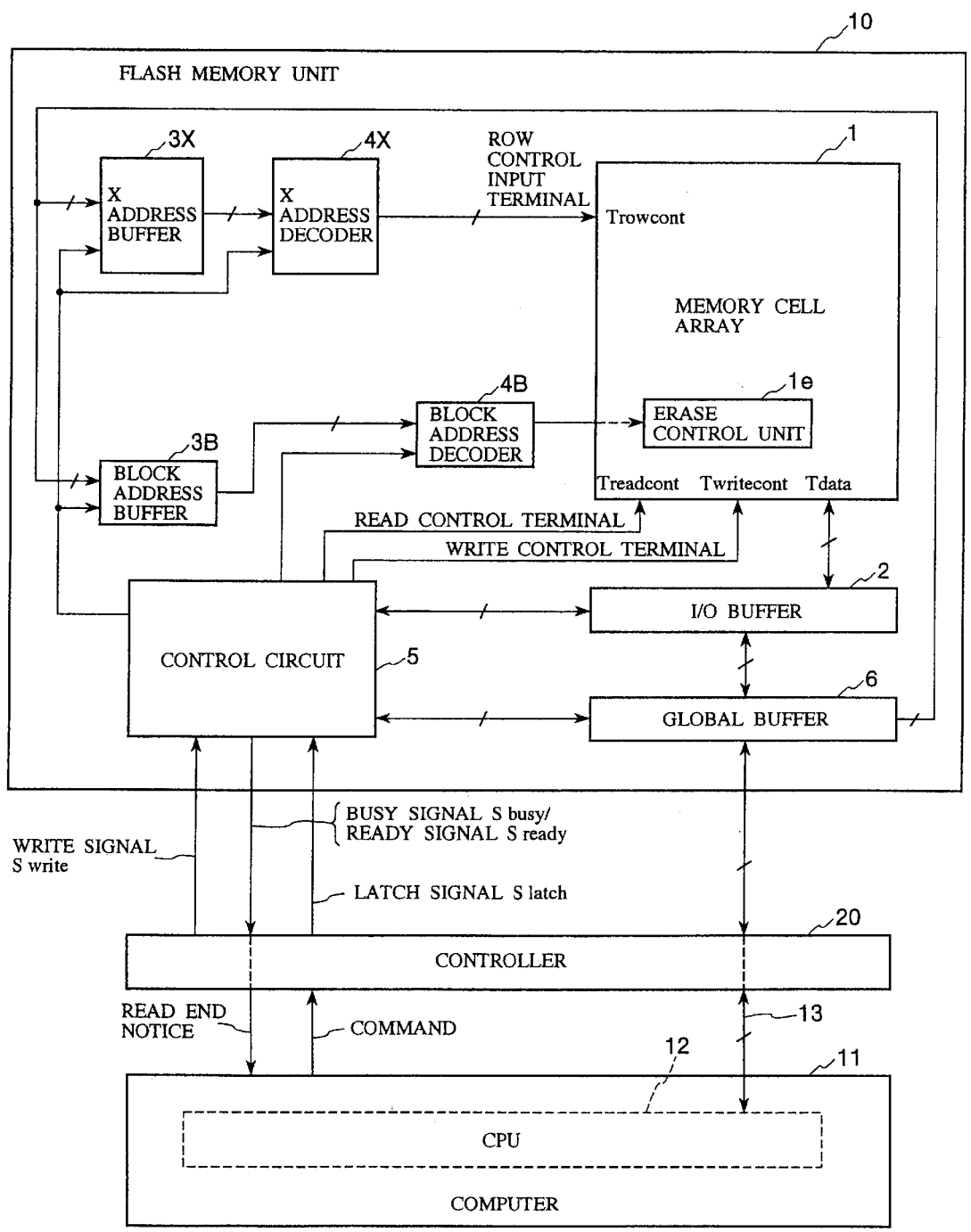
FIG. 1 is a block diagram illustrating the basic structure of a storage device according to an embodiment of this invention.

A storage device according to this embodiment, which stores an address translation table, etc. in a flash memory unit itself, comprises the flash memory unit 10 and a controller 20, as illustrated in FIG. 1.

The flash memory unit 10 comprises a memory cell array 1, an I/O buffer 2, an X address buffer 3X, a block address buffer 3B, an X address decoder 4X, a block address decoder 4B, a control circuit 5 and a global buffer 6.

The memory cell array 1 comprises a plurality of memory cells. Each memory cell is NAND type, for example, and has a storage capacity of 1 byte. Logically speaking, those memory cells are arranged in the form of a matrix having 16384 rows and 528 columns. Accordingly, the entire memory cell array 1 has a storage capacity of 8.65 megabytes.

The memory cell array 1 has eight data input-output terminals Tdata, 16384 row control input terminals Trowcont each being connected in common to the memory cells of the corresponding row, a read control terminal Treadcont and a write control terminal Twritecont both being common to all memory cells, and an erase control circuit 1e for erasing data.

When a control signal is supplied to a row control input terminal Trowcont while a control signal is being input to the read control terminal Treadcont of the memory cell array 1, the first and subsequent memory cells of the row supplied with the control signal output their storage contents 528 times in sequence by the amount (i.e., 1 byte) corresponding to one memory cell at a time to a data input-output terminal Tdata.

On the other hand, while the control signal is being input to the write control terminal Twritecont, the first and subsequent memory cells sequentially store, 528 times by 1 byte at a time, data which has been input from the data input-output terminal Tdata.

However, since each memory cell is NAND type, data recording can be performed only in the direction of changing a stored value from "1" to "0", and a memory cell whose stored value has been set at "0" once maintains the state of the stored value being "0" until the reset of the storage contents.

Figure 2:
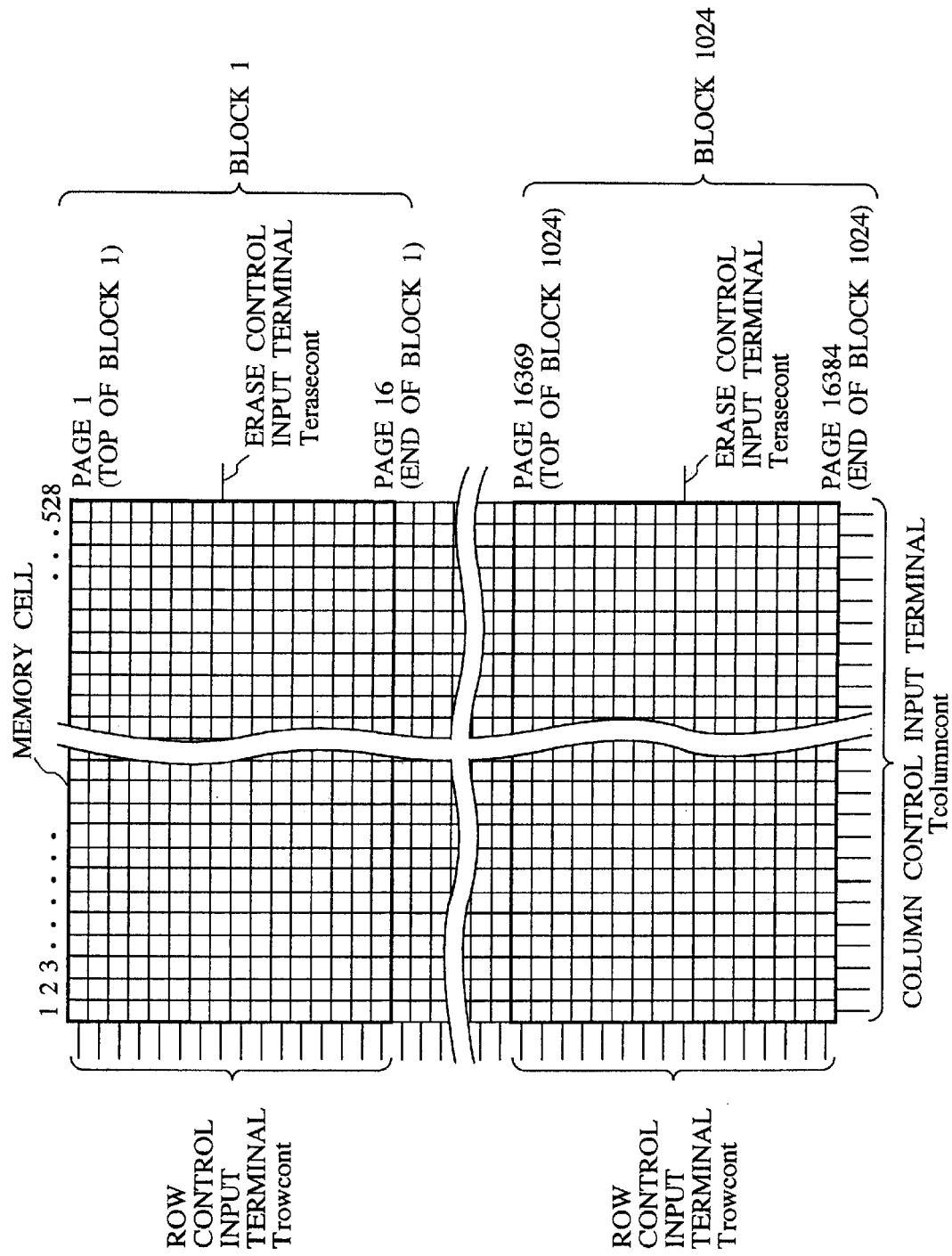
FIG. 2 is a diagram illustrating the structure of a memory cell array.

As shown in FIG. 2, each row in the matrix of memory cells forms a page having a storage capacity of 528 bytes. Serial page addresses 1 through 16384 are assigned to pages, while serial addresses 1 through 528 are assigned to memory cells contained in each page.

Figure 3:
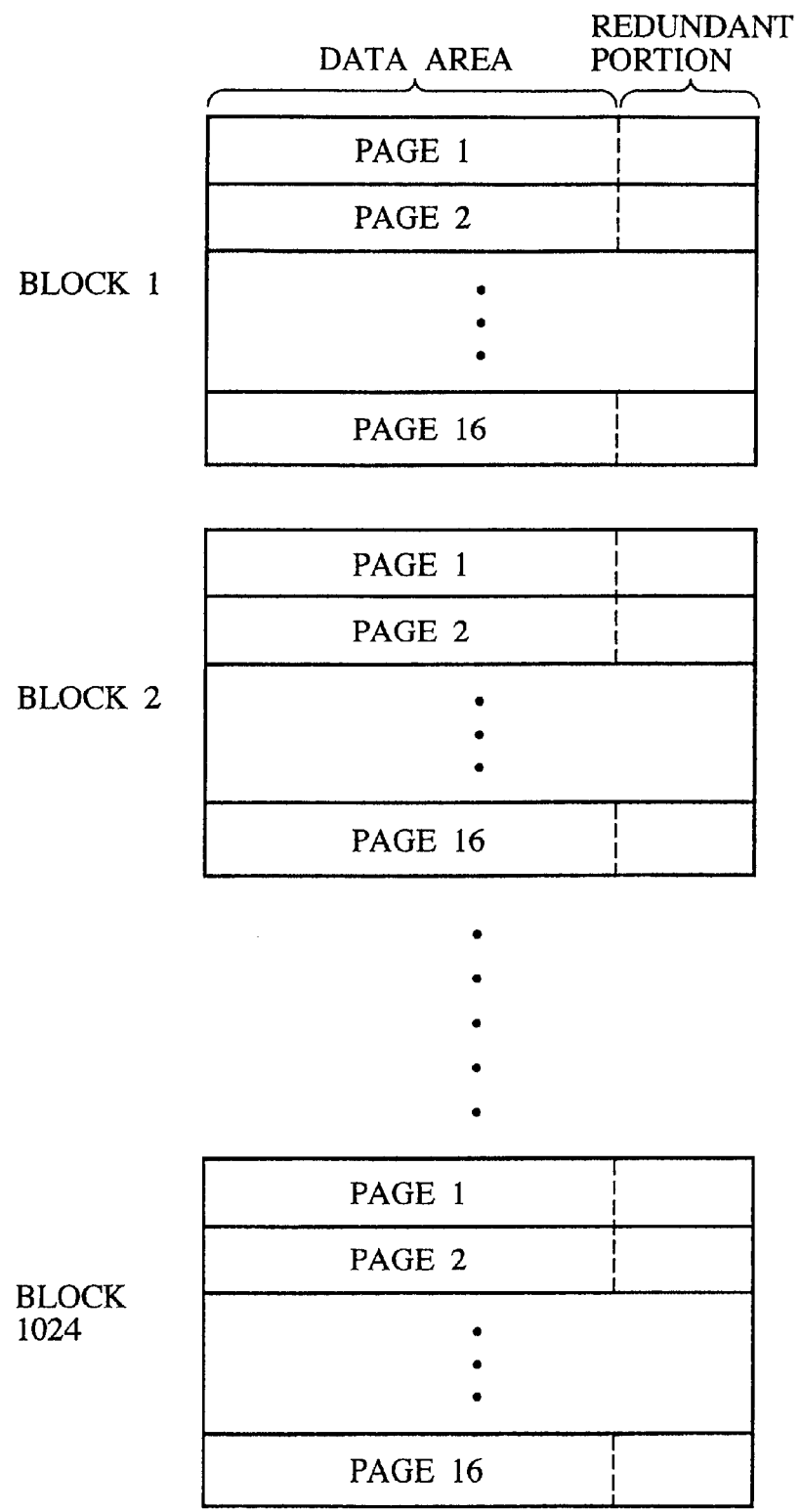
FIG. 3 is a diagram showing the logical structure of a storage area.

As shown in FIGS. 2 and 3, each block comprises 16 pages. Each block has a storage capacity of 8 kilobytes, and the entire storage area comprises 1024 blocks.

Moreover, each page has a data area which occupies an area formed of the first to $512^{th}$ bytes and a redundant portion which occupies the remaining 16 bytes. The essential data is stored in the data area, while an error check code, etc. are stored in the redundant portion.

And when a control signal as an instruction to erase data from a specific block is input to the erase control circuit 1e for data erase, the storage contents of all memory cells contained in the aforementioned block are reset (i.e. the value stored in each memory cell becomes "1").

The memory cell array 1 contains an empty block table and an address translation table stored therein for accessing the memory cell array 1.

The top page of an arbitrary block of the memory cell array 1 stores the empty block table that stores information showing which blocks of the memory cell array 1 are empty blocks (i.e., blocks in a reset state and containing no memory cells in which data "0" has been stored). Information on the block having the empty block table stored therein is stored in the control circuit 5, as will be explained later.

Figure 4:
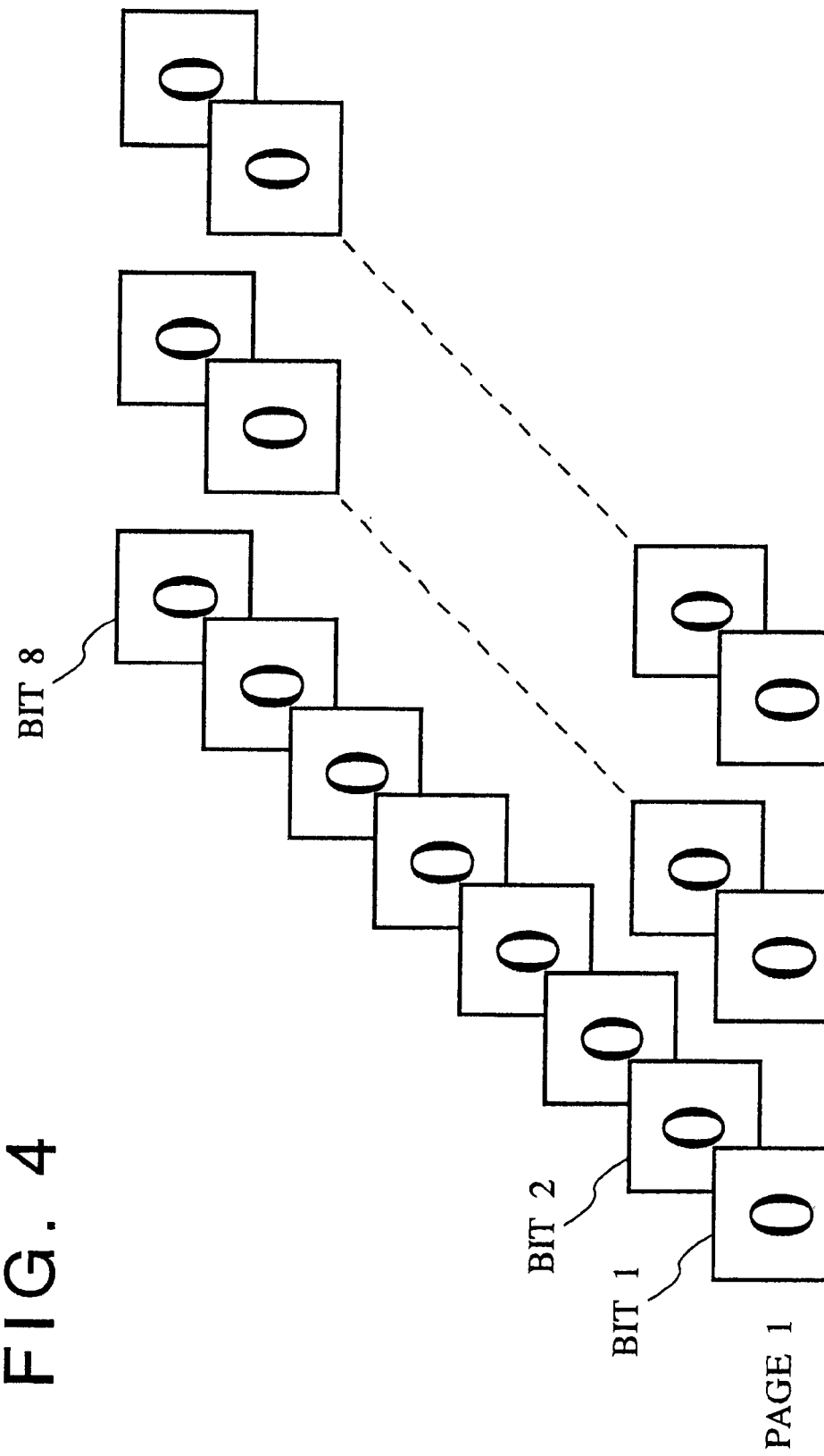
FIG. 4 is a diagram exemplifying the structure of an empty block table.

An example of the structure of the empty block table when the memory cell array 1 has 1024 blocks in total is illustrated in FIG. 4. This empty block table is made up of memory cells of the first 128 bytes (i.e., the first to $1024^{th}$ bits) at the top of a specific block, and the first to $1024^{th}$ bits which are in one-to-one correspondence with blocks 1 to 1024 store "1" when the corresponding blocks are empty blocks, and store "0" when the corresponding blocks are not empty blocks.

The address translation table, stored in the second and subsequent pages of the block having the empty block table stored therein, stores information representing logical addresses assigned to the individual blocks of the memory cell array 1.

When the storage device is subjected to reading and writing by the operations which will be explained later, a CPU (Central Processing Unit)12 included in an external computer 11, which will be explained later, and the controller 20, etc. recognize the logical addresses as a unit of data to be read or written.

The total capacity of areas to which the logical addresses have been assigned corresponds to a predetermined value smaller than the storage capacity of the memory cell array 1, the predetermined value being 16000 pages, for example, while the storage area occupied by each logical address corresponds to the storage area occupied by one page, for example.

Specifically, in the case where a virtual storage area, having the size (e.g. 16000 pages) corresponding to a predetermined value smaller than the storage capacity of the memory cell array 1, is divided into sections each being 512 bytes and when serial numbers beginning with 0 are assigned to the aforementioned sections, those serial numbers, i.e., LBAs (Logic Block Addresses), serve as the logical addresses.

Figure 5:
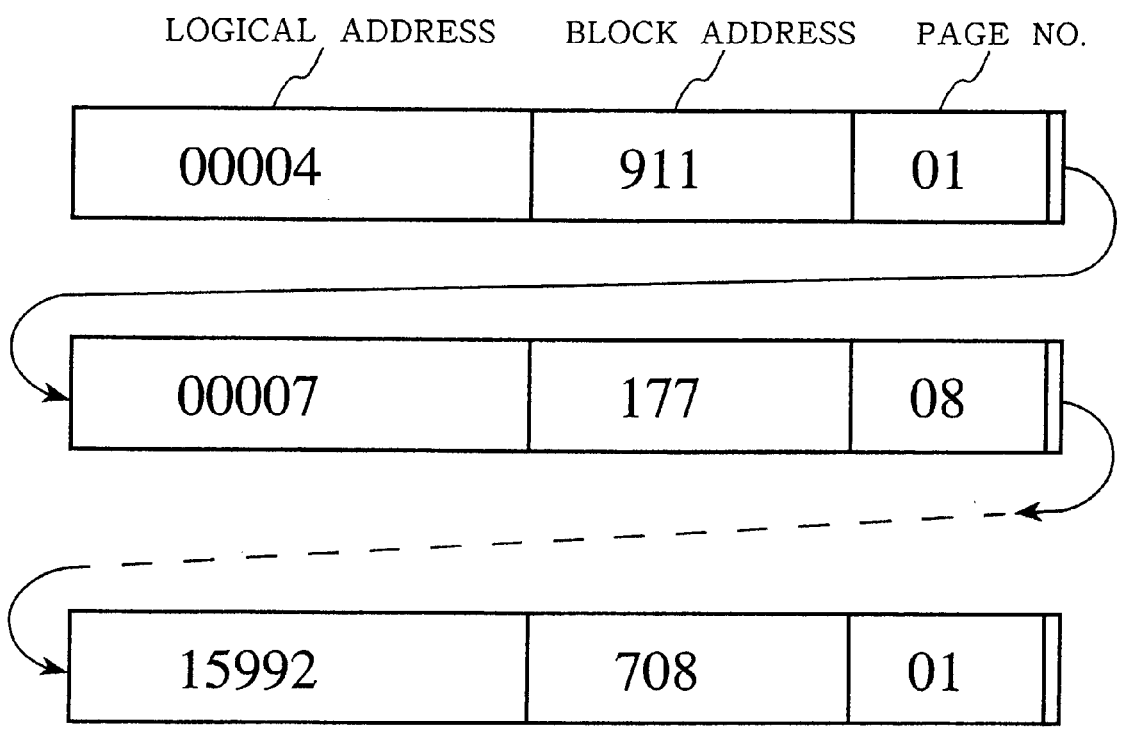
FIG. 5 is a diagram exemplifying the structure of an address translation table.

An example of the structure of the address translation table is illustrated in FIG. 5. The address translation table contains a plurality of records, a logical address is stored at the head of each record, and the number (block address) assigned to a block in which the top page of an area associated with the logical address is located and the number assigned to the top page are stored following the logical address.

As illustrated in FIG. 1, the I/O buffer 2 is connected to the global buffer 6, the data input-output terminals Tdata of the memory cell array 1 and the control circuit 5.

In accordance with instructions from the control circuit 5, the I/O buffer 2 performs the operation of outputting, by 1 byte at a time, data stored in the global buffer 6 to the data input-output terminals Tdata of the memory cell array 1, as well as the operation of outputting, by 1 byte at a time, data which has been output from the data input-output terminals Tdata, to the global buffer 6.

The X address buffer 3X, to which a row address signal representing a row address (i.e., a page address) of the memory cell array 1 has been input from the global buffer 6, outputs the row address to the X address decoder 4X.

The X address decoder 4X supplies a control signal having an active level to the row control input terminal Trowcont for the row specified by the row address signal or designated by the control circuit 5.

The block address buffer 3B, to which a block address signal representing an address of each block of the memory cell array 1 has been input from the global buffer 6, outputs the block address signal to the block address decoder 4B.

The block address decoder 4B supplies, to the erase control circuit 1e, a signal representing an instruction to erase data from the block specified by the block address signal or designated by the control signal 5.

The control circuit 5, to which a command is input from the global buffer 6, analyzes the command and controls the X address buffer 3X, the X address decoder 4X, the block address decoder 4B and the I/O buffer 2 in accordance with the result of the analysis.

Furthermore, a write signal Swrite and a latch signal Slatch are supplied to the control circuit 5 from the controller 20. And the control circuit 5 controls the memory cell array 1 and the global buffer 6 in accordance with those signals, as will be explained later. Moreover, the control circuit 5 supplies a busy signal Sbusy and a ready signal Sready to the controller 20 at the timing which will be explained later.

Further, when data stored in the global buffer 6 represents a predetermined command such as a setup command, an erasing command or the like which will be explained later, the control circuit 5 executes the process designated by the command.

In addition, the busy signal Sbusy and the ready signal Sready may be transmitted through the same signal line. Then, for example, the control circuit 5 may supply the busy signal Sbusy in the case where the control circuit 5 applies a voltage representing a binary logic value "1" to a predetermined signal line, whereas in the case where the control circuit 5 applies a voltage representing a binary logical value "0", the control circuit 5 may supply the ready signal Sready.

The global buffer 6 is connected to the I/O buffer 2, the control circuit 5 and the controller 20. And the global buffer 6 stores, of signals on the bus line 13 and the storage contents of the I/O buffer 2, one which is being supplied to the global buffer 6 itself at the time of the supply of the control signal output from the control circuit 5, and outputs the contents as stored to the X address buffer 3X or the control circuit 5, in accordance with the aforementioned control signal.

The controller 20 comprises a CPU, etc., and is connected to the control circuit 5 of the flash memory unit 10, and is connected also to the global buffer 6 of the flash memory unit 10 and the CPU 12 of the computer 11 via the bus line 13. However, the CPU which the controller 20 comprises may be identical with the CPU 12 of the computer 11;

In accordance with a command supplied from the CPU 12 or the like which the external computer 11 comprises, the controller 20 supplies the write signal Swrite and the latch signal Slatch to the control circuit 5 as will be explained later, and supplies a physical address, to-be-written data, a command, etc. to the global buffer 6, in order to control the flash memory unit 10.

Furthermore, the controller 20 stores data representing the locations of the address translation table, the location of the empty block table and the location of the block which has undergone writing most lately, and refers to the data which the controller 20 has stored in itself, when executing a process which will be explained later in accordance with a command supplied from the CPU 12. Moreover, when the amount (i.e., the number of bytes) of to-be-written data, expressed in units of bytes, is supplied to the controller 20 from the CPU 12, the controller 20 stores and refers to the aforementioned amount during a process which will be explained later.

(Operation of First Embodiment)

A process for writing data in this storage device will now be explained with reference to FIGS. 6 to 10.

Figure 6:
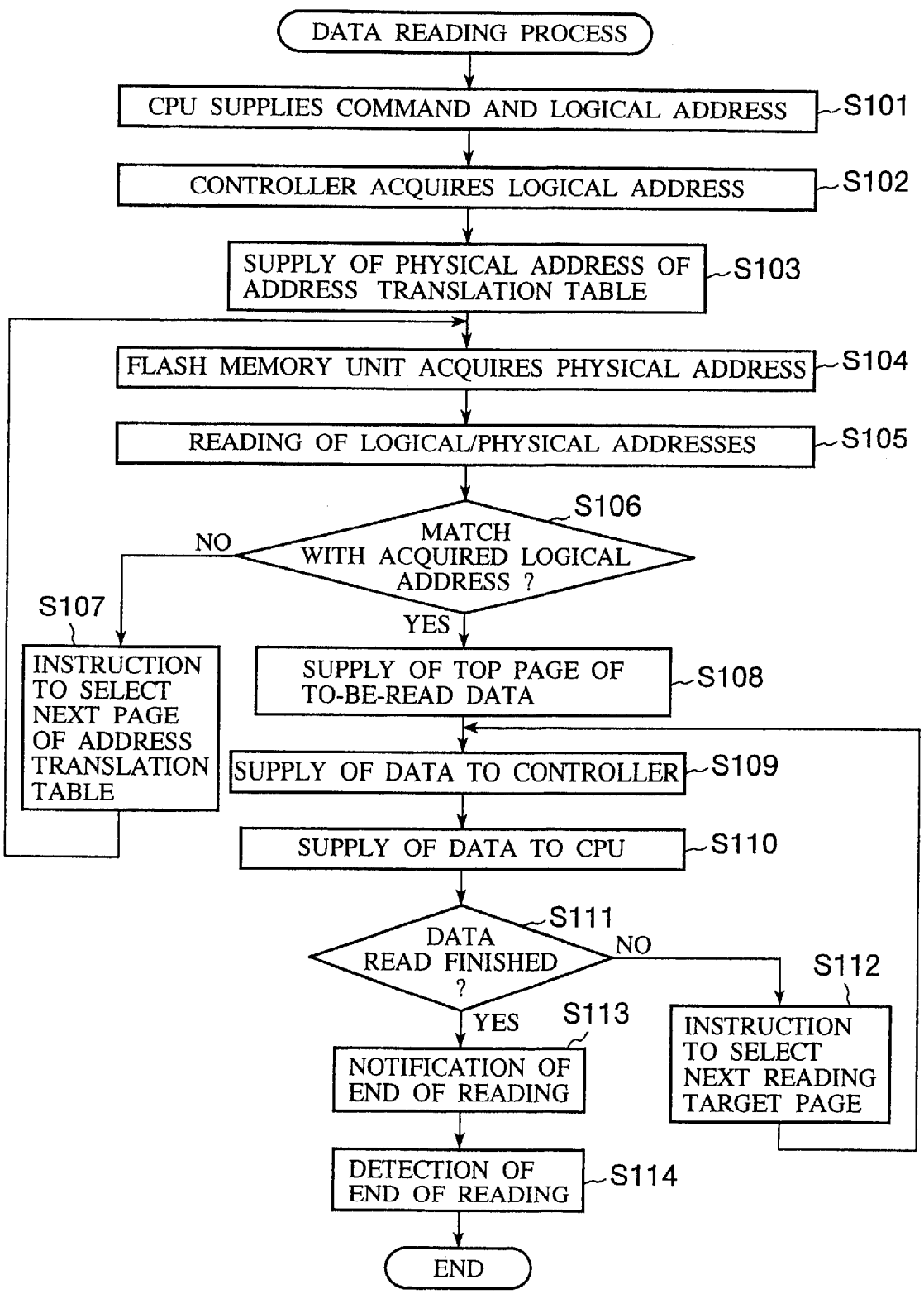
FIG. 6 is a flowchart showing a data reading process.
Figure 7:
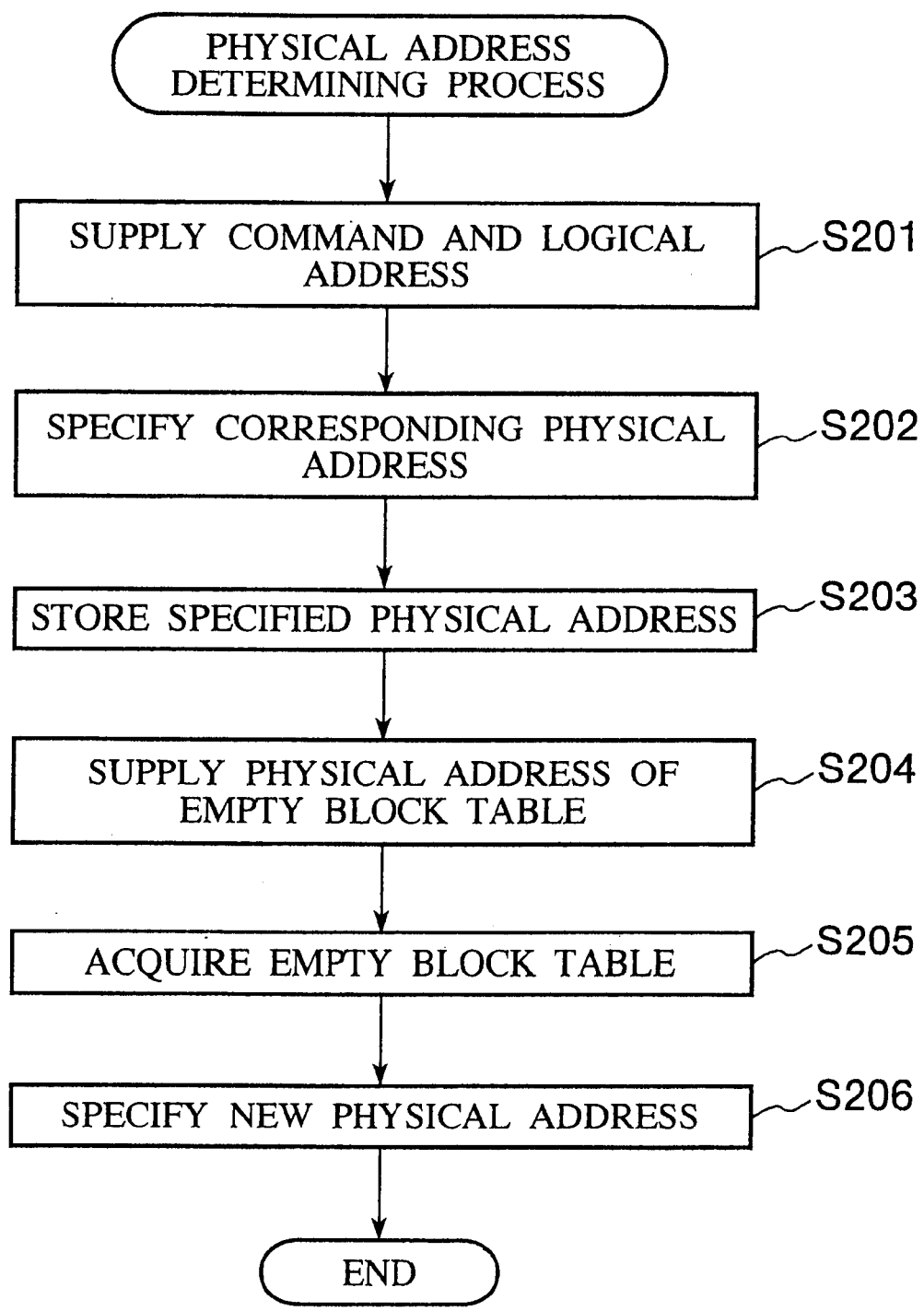
FIG. 7 is a flowchart showing a physical address determining process.
Figure 8:
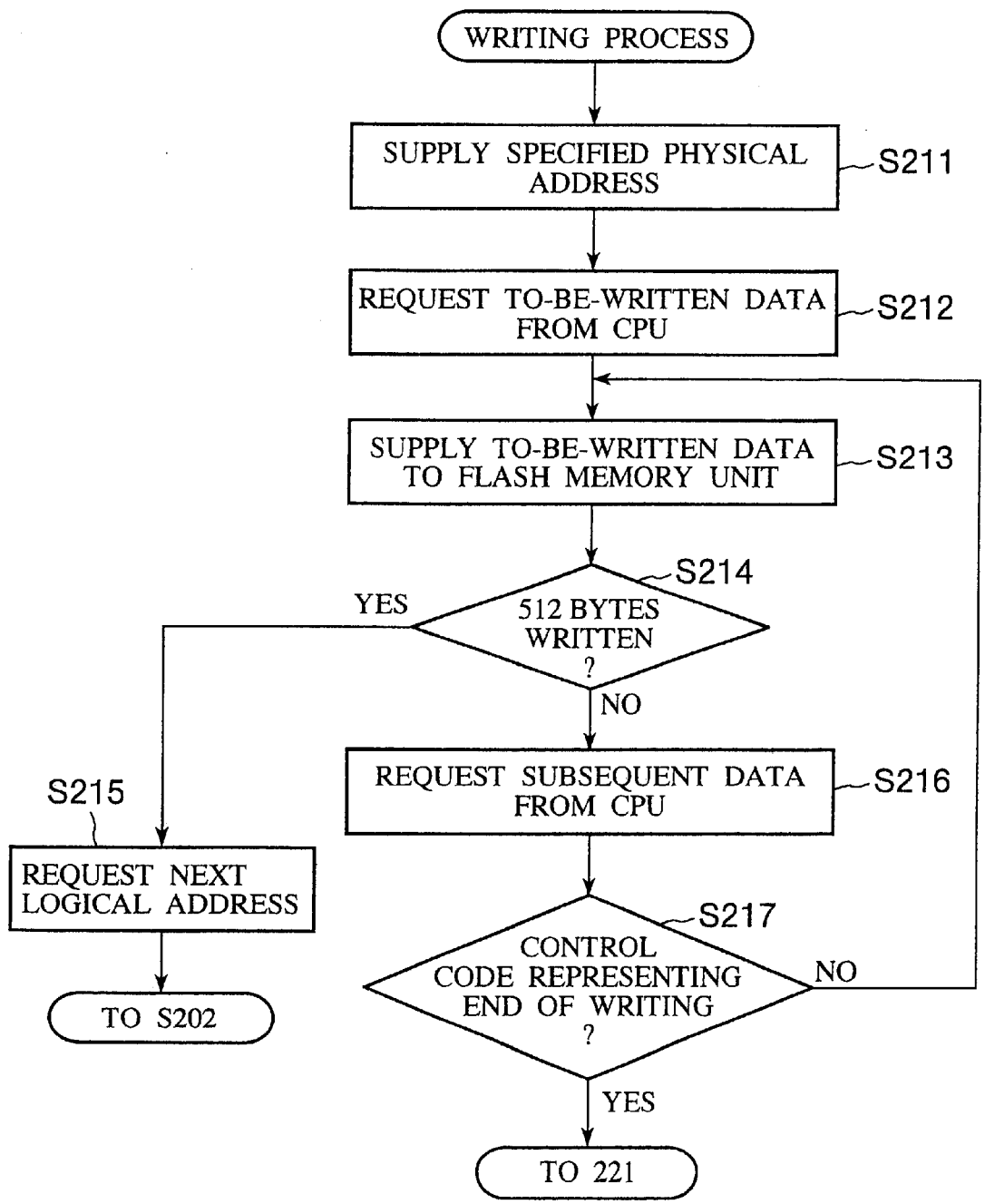
FIG. 8 is a flowchart showing a writing process.
Figure 9:
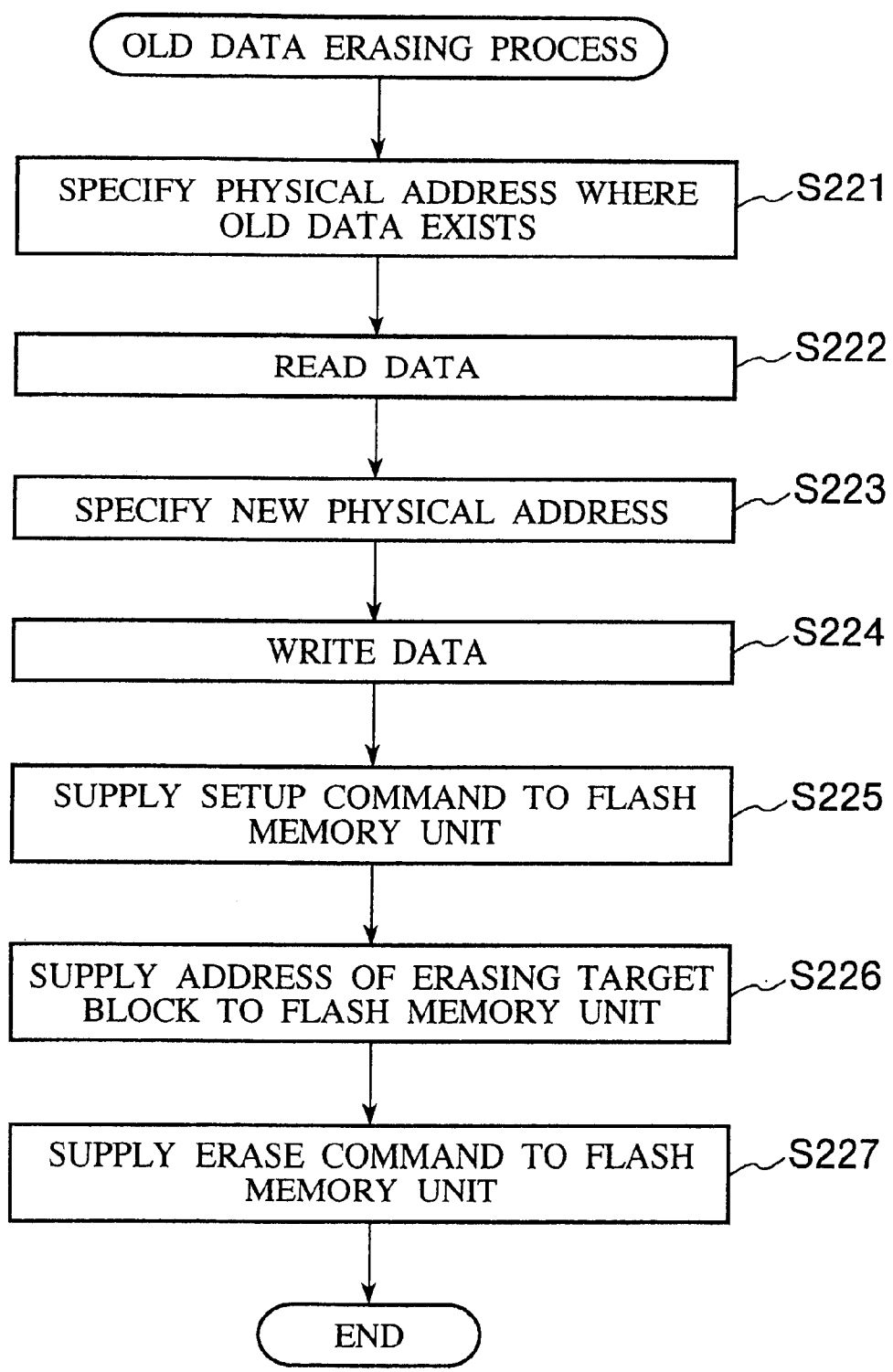
FIG. 9 is a flowchart showing an old data erasing process.

FIG. 6 is a flowchart showing a data reading process;

FIG. 7 is a flowchart showing a physical address determining process;

FIG. 8 is a flowchart showing a writing process;

FIG. 9 is a flowchart showing an old data erasing process; and

Figure 10:
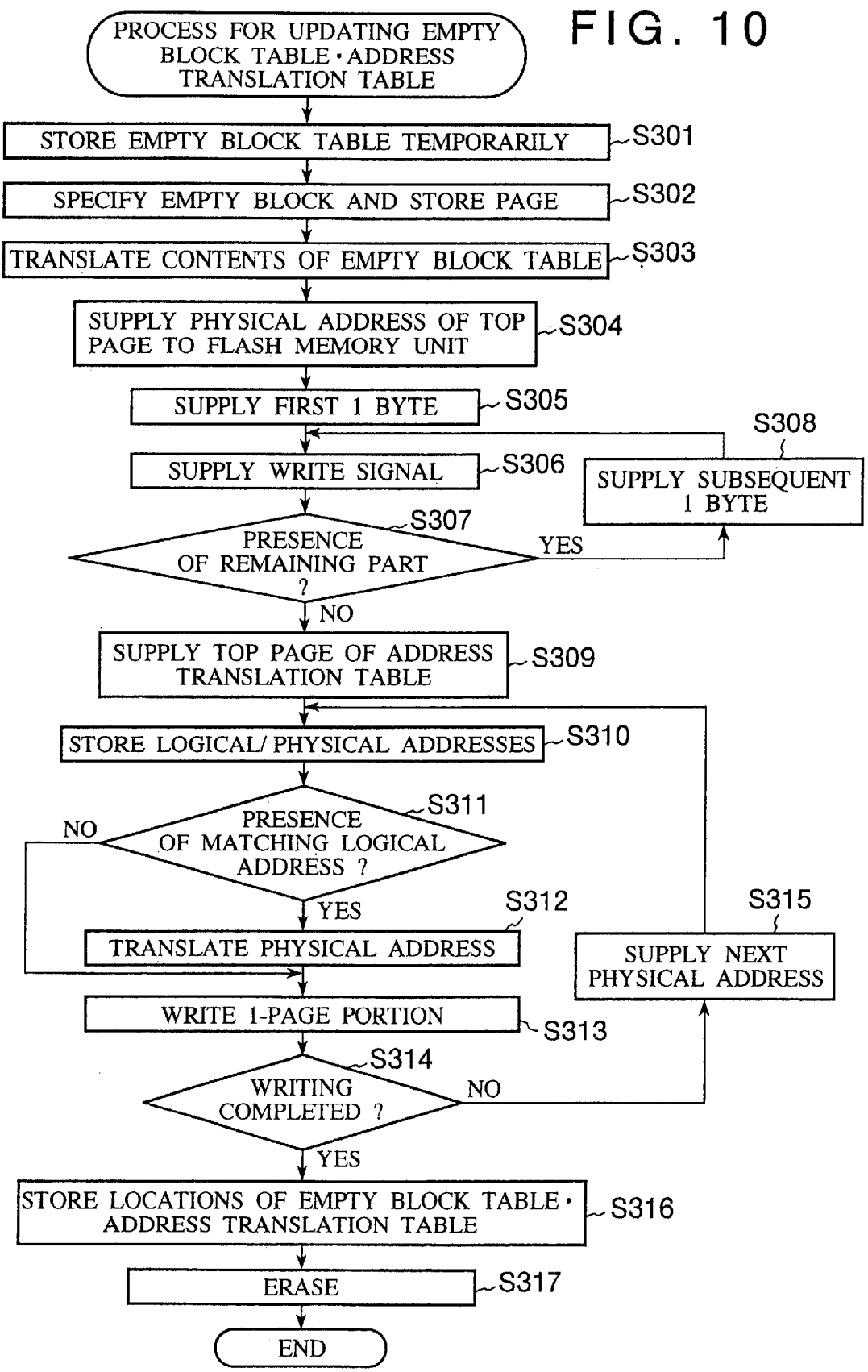
FIG. 10 is a flowchart showing a process for updating the empty block table and the address translation table.

FIG. 10 is a flowchart showing a process for updating the empty block table and the address translation table.

(Data-Reading)

In the case of reading data from this storage device, the CPU 12 within the computer 11 executes the data reading process shown in FIG. 6.

When the process is started, the CPU 12 outputs, onto the bus line 13, a logical address where to-be-read data has been stored, and supplies the controller 20 with a data read command and the number of pages of the storage area in which the to-be-read data has been stored (FIG. 6, a step S101).

In response to the command from the CPU 12, the controller 20 acquires the logical address and the page number supplied through the bus line 13, and stores both of them (a step S102).

Then, the controller 20 supplies the physical address of the top page of the address translation table to the global buffer 6, sends the latch signal Slatch to the control circuit 5, and waits for the supply of the ready signal Sready from the control circuit 5 (a step S103).

In response to the latch signal Slatch from the controller 20, the control circuit 5 starts supplying the busy signal Sbusy to the controller 20 and sends, to the global buffer 6, an instruction to latch the physical address which the controller 20 is supplying. In response to this instruction, the global buffer 6 latches the physical address which the controller 20 is supplying (a step S104). Of the physical address latched by the global buffer 6, a portion corresponding to a block address is supplied to the block address decoder 4B through the block address buffer 3B, while a portion corresponding to a page address is supplied to the X address decoder 4X through the X address buffer 3X.

In order to read the address translation table, the control circuit 5 gives an instruction to select a page specified by the page address to the X address decoder 4X to which the page address has been supplied from the global buffer 6.

In response to the instruction from the control circuit 5, the X address decoder 4X outputs a control signal having an active level to a row control input terminal Trowcont destined for a page where the address translation table has been stored. By so doing, that page of the address translation table which has been designated by the controller 20 is selected.

Next, the control circuit 5 sends a data read instruction to the read control terminal Treadcont of the memory cell array 1, stops the supply of the busy signal Sbusy, and supplies the ready signal Sready to the controller 20. Meanwhile, the memory cell array 1 sequentially outputs, by 1 byte at a time, the storage contents of the aforementioned page of the address translation table to the controller 20 through the I/O buffer 2 and the global buffer 6.

Meanwhile, the controller 20 reads each logical address stored in the aforementioned page and the physical address associated with each logical address by sequentially reading information supplied from the global buffer 6 (a step S105).

Then, the controller 20 determines whether the individual logical addresses read from the address conversion table include a logical address which matches with the logical address acquired in the step S102 from the CPU 12 (a step S106).

When the controller 20 determines the absence of a matching logical address in the step S106, the controller 20 supplies the physical address of the next page of the address translation table to the global buffer 6 and sends the latch signal Slatch to the control circuit 5 (a step S107), and this storage device returns the process to the step S104.

On the other hand, when the controller 20 determines the presence of a matching address in the step S106, the storage device advances the process a step S108.

In the step S108, the controller 20 supplies, to the global buffer 6, the value of a physical address (i.e., the physical address of the top one of pages containing to-be-read data) shown by the logical address determined as being a matching address in the step S106, and s end s the latch signal Slatch to the control circuit 5.

Then, the flash memory unit 10 performs substantially the same procedure as that in the case of responding to the latch signal which the controller 20 has supplied in the step S103, and the flash memory unit 10 sequentially supplies, by 1 byte at a time, the contents stored at the physical address which the controller 20 has supplied to the global buffer 6 (i.e., the contents of the top page of an unread part of the to-be-read data) to the controller 20 via the global buffer 6 (a step S109).

Meanwhile, the controller 20 reads the to-be-read data by sequentially reading information supplied sequentially from the global buffer 6 in the step S109, and supplies the read data to the CPU 12 through the bus line 13 (a step S110).

And the controller 20 determines whether the number of pages read after the start of the processing of the step S108 has reached the page number supplied from the CPU 12 and which the controller 20 has stored in itself during the step S102 (a step S111).

And when the controller 20 determines that the number of pages has not yet reached the aforementioned page number, the controller 20 supplies the next physical address where the to-be-read data has been stored to the global buffer 6, and sends the latch signal Slatch to the control circuit 5 (a step S112). Then, this storage device returns the process to the step S109.

On the other hand, when the controller 20 determines that the number of pages has reached the aforementioned page number, the controller 20 notifies the CPU 12 about the end of reading by way of sending an end code to the CPU 12 through the bus line 13 or sending a non-illustrated control signal to the CPU 12, for example (a step S113).

When the CPU 12 detects the end of reading (a step S114), it terminates the reading process.

By the procedure of the steps S101 to S114, the location of the physical address corresponding to a logical address is found through the use of the address translation table which the memory cell array 1 has stored in itself, and data present in that location is read sequentially.

In the case where there are a plurality of logical read addresses, the procedure of the steps S101 to S114 is repeated the number of times corresponding to the number of logical read addresses.

(Data Write: Determination of New Physical Address)

In the case of writing data in the memory cell array 1, this storage device conducts a physical address determining process shown in FIG. 7, and executes a procedure for determining physical data write addresses.

First of all, from the size of to-be-written data, for example, the CPU 12 calculates the number of pages required for writing, on the assumption that the storage capacity of one page is 512 bytes, and the CPU 12 determines the logical write addresses.

Then, the CPU 12 sends, onto the bus line 13, the logical address having the smallest number assigned thereto among the logical write addresses, and sends a data write command to the controller 20 (a step S201).

In response to the command sent from the CPU 12 in the step S201, the controller 20 performs substantially the same procedure as that of the steps S103 to S107 included in the process shown in FIG. 6 (S202).

Specifically, the contents of the address translation table are read out from the flash memory unit 10, and a determination is sequentially performed as to whether the read contents include an address which matches with the logical address acquired from the CPU 12 in the step S201, thereby specifying the physical address associated with the logical address acquired from the CPU 12.

When the physical address is specified in the step S202, the controller 20 stores the specified physical address (a step S203). Then, in order to read the empty block table, the controller 20 supplies the physical address of the empty block table to the global buffer 6, and sends the latch signal Slatch to the control circuit 5 (a step S204).

As in the case where the latch signal Slatch is supplied in the step S103, the control circuit 5 causes the X address decoder 4X to select a page which contains the empty block table.

And when the page is selected, the control circuit 5 sends a data read instruction to the read control terminal Treadcont of the memory cell array 1. Upon reception of the instruction, the memory cell array 1 sequentially outputs, by 1 byte at a time, the storage contents of the aforementioned page containing the empty block table to the controller 20 through the I/O buffer 2 and the global buffer 6.

And the controller 20 sequentially reads information supplied from the global buffer 6, thereby acquiring the empty block table (a step S205).

Next, based on the contents of the acquired empty block table, the controller 20 specifies a physical address belonging to an arbitrary empty block (a step S206), and determines to hereafter handle the physical address, specified in the step S206, as that shown by a logical write address.

However, any physical address which has already been specified in the step S206 after the start of the process of FIG. 7 is not specified in the step S206 again.

Furthermore, in the step S206, the block to which belongs the physical address that has been specified in the step S206 after the start of the process of FIG. 7, is handled as an empty block even after data has been written at the above-mentioned physical address.

Moreover, a physical address to which no logical address has been assigned may be selected as a physical write address.

(Data Write: Writing into Flash Memory)

Having finished the processing of the step S206, the controller 20 executes a writing process shown in FIG. 8.

That is, when the controller 20 specifies a physical address by the procedure of the step S206, it supplies the specified physical address to the global buffer 6 and sends the latch signal Slatch to the control circuit 5 (a step S211).

In response to the latch signal Slatch, the control circuit 5 stops the supply of the busy signal Sbusy, and starts the supply of the ready signal Sready to the controller 20. Then, the control circuit 5 causes the X address decoder 4X to select the physical address specified in the step S206.

Meanwhile, in response to the ready signal Sready, the controller 20 requests the CPU 12 to supply to-be-written data (a step S212), in response to which request the CPU 12 supplies the first 1 byte of the to-be-written data to the controller 20 through the bus line 13.

And the controller 20 stores and supplies, to the global buffer 6, the to-be-written data supplied from the CPU 12 through the bus line 13, and sends the write signal Swrite to the control circuit 5 (a step S213).

In response to the write signal Swrite, the control circuit 5 instructs the global buffer 6 to latch the to-be-written data supplied to the global buffer 6, stops the supply of the ready signal Sready, and restarts the supply of the busy signal Sbusy to the controller 20. The global buffer 6 latches the data on the bus line 13 and stores it in the I/O buffer 2.

Then, the control circuit 5 instructs the I/O buffer 2 to output the data stored in the I/O buffer 2 to a data input-output terminal Tdata. In response to the instruction, the I/O buffer 2 outputs the data which the global buffer 6 has stored in the I/O buffer 2 itself to the data input-output terminal Tdata.

Next, the control circuit 5 outputs a write control signal having the active level to the write control terminal Twritecont, in order to cause the memory cell array 1 to store the data which is being currently output to the data input-output terminal Tdata. In response to the write control signal, the memory cell array 1 stores the data, which is being input to the data input-output terminal Tdata, in the first memory cell of the currently selected page.

Having output the write control signal having the active level to the write control terminal Twritecont of the memory cell array 1, the control circuit 5 stops the supply of the busy signal Sbusy and restarts the supply of the ready signal Sready to the controller 20. Upon detecting the restart of the supply of the ready signal Sready, the controller 20 advances the process to a step S214.

In the step S214, the controller 20 sends a signal to request the subsequent data, and thereafter determines whether 512-byte data has been written in the currently selected page, with reference to the value of a byte counter.

And when the controller 20 determines that 512-byte data has been written, it requests the CPU 12 to send the next logical address (a step S215).

Then, the CPU 12 sends the next logical address onto the bus line 13, and when the controller 20 acquires the logical address, the controller 20 determines to handle the logical address as one acquired in the step S201, and returns the process to the step S202 included in the process of FIG. 7.

On the other hand, when the controller 20 determines that 512-byte data has not been written, the controller 20 sends a signal to request the subsequent data to be written to the CPU 12 (a step S216).

In response to this signal, the CPU 12 determines whether there is any subsequent data to be written, and when the CPU 12 determines that there is no subsequent data, it supplies a control code representing the end of writing to the bus line 13. On the other hand, when the CPU 12 determines that there is the subsequent data, it supplies the subsequent 1-byte data to the bus line 13.

When the subsequent data or the control code representing the end of writing is supplied from the CPU 12 after the controller 20 has sent a signal to request the subsequent data in the step S206, the controller 20 determines whether the supplied one is the control code representing the end of writing (a step S217).

When the controller 20 determines that the supplied one is not the control code, it returns the process to the step S213, whereas when the controller 20 determines that the supplied one is the control code, it goes to an old data erasing process shown in FIG. 9.

In addition, a method by which the CPU 12 notifies the controller 20 of the absence of the to-be-written data is arbitrary and is not limited to the supply of the control code through the bus ine 13; for example, a control signal representing the absence of the to-be-written data may be sent to the controller through any other arbitrary control line.
(Data Write: Old Data Erase)

The controller 20, which has acquired the control code representing the end of writing, executes the old data erasing process shown in FIG. 9.

Upon start of the process shown in FIG. 9, the controller 20 firstly specifies a physical address belonging to the same block as that of the physical address (i.e., the old physical address which had been associated with a logical write address until a new physical address was brought into association with the logical write address in the step S206) that the control 20 has s to red in itself during the step S203, based on the contents of the address translation table which has been read already (a step S221).

And this storage device uses each physical address specified in the step S221 as one representing the top page of the to-be-written data, and performs data reading in regard to each physical address by the procedure of the steps S108 to S114 shown in FIG. 6 (a step S222). Furthermore, the controller 20 conducts substantially the same procedure as that of the steps S204 to S206, and specifies a physical address where the data read by the step S222 is to be stored (a step 223).

In the step S223, however, the controller 20 does not specify a physical address belonging to the same block as that in which the read data has been stored.

Next, this storage device writes the data read by the step S222 at the physical address specified by the step S223, in accordance with the process shown in FIG. 8 (a step S224).

Following the above, the controller 20 supplies, to the global buffer 6, a predetermined setup command for specifying a block from which the storage contents are to be erased, and sends the latch signal Slatch to the control circuit 5 (a step S225).

The control circuit 5, when the latch signal Slatch is supplied thereto by the step S225, detects that the data supplied to the global buffer 6 is the setup command, and determines to handle data, which will be supplied to the global buffer 6 next, as the block address of the block from which the storage contents are to be erased.

Then, the controller 20 supplies, to the global buffer 6, the block address of the block (i.e., the block to which belongs the physical address that the controller 20 has stored in itself during the step S203) from which the storage contents are to be erased, and sends the latch signal Slatch to the control circuit 5 (a step S226).

In response to the latch signal Slatch supplied in the step S226, the control circuit 5 sends an instruction to the global buffer 6 so as to cause the global buffer 6 to latch the block address which the controller 20 is supplying. The block address latched by the global buffer 6 is supplied to the block address decoder 4B through the block address buffer 3B, whereby the block from which the storage contents are to be erased is selected.

Next, the controller 20 supplies a predetermined erase command for erasing the storage contents to the global buffer 6, and sends the latch signal Slatch to the control circuit 5 (a step S227).

The control circuit 5, when the latch signal Slatch is supplied thereto in the step S227, detects that the data supplied to the global buffer 6 is the erasing command, and instructs the block address decoder 4B to erase the storage contents of the selected block.

The block address decoder 4B which has received the instruction sends, to the erase control circuit 1e, a signal representing an instruction to erase data from the block selected as an erasing target. As a result, the storage contents of the aforementioned block are erased.

By the procedure of the steps S221 to S227, data recorded in the memory cell array 1 is erased, and data stored in the same block as that of the erased data is saved to other pages.

In addition, the old data erasing process is not necessarily performed after the writing process. For example, therefore, after a physical data write address is determined, the storage contents of a block with an old physical address, which had been associated with a logical address until the logical address was newly brought into association with the physical data write address, may be deleted first, and then new data may be written at the physical data write address.

Moreover, the scene wherein data erase is effected is not limited to that wherein data erase is performed as a part of the data writing process as in the case of the above-described steps S221 to S227.

Therefore, data erase can be performed without the writing of new data being involved.

To be specific, the CPU 12, for example, firstly sends a data erase command to the controller 20, and supplies a logical erase address to the controller 20 through the bus line 13.

In response to the command, the controller 20 conducts the same procedure as that of the steps S201 to S203 included in the process of FIG. 7, and specifies a physical address (i.e., a physical erase address) designated by the logical erase address.

And the controller 20 handles the specified physical erase address as that specified by the step S203, and conducts the procedure of the aforementioned steps S221 to S227. By so doing, the storage contents of the block to which the physical erase address belongs are erased.

In addition, in the case of designating new physical write addresses in the above-described data writing process, the controller 20 may designate the new physical write addresses so that data can be sequentially written in the blocks following the empty block in which data has been written last time and so that when those blocks include no empty block, data may be sequentially written in any empty blocks following the top block.

Due to this, since empty blocks undergo writing cyclically, a specific block does not frequently undergo data update, avoiding the situation in which the performance of the specific block only is deteriorated.
(Update of Empty Block Table and Address Translation Table)

When data erase and data write are completed by the above-described procedures, the controller 20 initiates the process shown in FIG. 10 in order to update the empty block table and the address translation table.

In the process of FIG. 10, in order to acquire the empty block table from the flash memory unit 10, the controller 20 firstly conducts the substantially the same procedure as that of the steps S201 to S205 shown in FIG. 7, and stores the empty block table temporarily (a step S301).

Then, based on the contents of the temporarily stored empty block table, the controller 20 specifies one empty block in order to newly write the empty block table and the address translation table, and stores the top page of that block (a step S302).

Then, of the temporarily stored empty block table, the controller 20 translates, from "1" to "0", bits representing the empty block in which data has been written and the empty block specified by the step S302, as well as bits representing the blocks to which the physical addresses specified by the steps S206 and S223 belong. Furthermore, the controller 20 translates, from "0" to "1", a bit representing the block in which the empty block table and the address translation table are present currently and a bit representing the block whose storage contents have been erased by the step S227 (a step S303).

Next, the controller 20 supplies the physical address of the top page of the block specified by the step S302 to the global buffer 6, and sends the latch signal Slatch to the control circuit 5 (a step S304).

In response to the latch signal Slatch, the control circuit 5 stops the supply of the busy signal Sbusy, and starts the supply of the ready signal Sready to the controller 20. And the control circuit 5 causes the X address decoder 4X to select the physical address supplied from the controller 20 to the global buffer 6.

Meanwhile, in response to the ready signal Sready, the controller 20 supplies the first 1 byte of the empty block table translated by the step S303 to the global buffer 6 (a step S305), and sends the write signal Swrite to the control circuit 5 (a step S306).

In response to the write signal Swrite, the control circuit 5 causes the global buffer 6 to latch the data supplied from the controller 20 to the global buffer 6, stops the supply of the ready signal Sready, and restarts the supply of the busy signal Sbusy to the controller 20. The global buffer 6 latches the data on the bus line 13, and stores it in the I/O buffer 2.

Next, the control circuit 5 causes the I/O buffer 2 to supply the data which the I/O buffer 2 has stored to a data input-output terminal Tdata, supplies the write control signal having the active level to the write control terminal Twritecont, and records the data which is being supplied to the data input-output terminal Tdata in the first memory cell of the currently selected page.

And the control circuit 5 stops the supply of the busy signal Sbusy, and restarts the supply of the ready signal Sready to the controller 20.

When the controller 20 detects the restart of the ready signal Sready, it determines whether any part of the empty block table, which the controller 20 has stored in itself, remains unsupplied to the flash memory unit 10 (a step S307).

And when the controller 20 determines that any part of the empty block table remains unsupplied, the controller 20 supplies the subsequent 1 byte of the empty block table, which the controller 20 has temporarily stored in itself, to the global buffer 6 (a step S308) and returns the process to the step S306.

On the other hand, when the controller 20 determines that no part of the empty block table remains unsupplied, the controller 20 supplies the physical address of the top page of the address translation table to the global buffer 6 in order to update the address translation table, supplies the latch signal Slatch to the control circuit 5, and waits for the supply of the ready signal Sready from the control circuit 5 (a step S309).

Then, the flash memory unit 10 stops the supply of the busy signal Sbusy, supplies the ready signal Sready to the controller 20, and provides the controller 20 with the storage contents of that page of the address translation table which has been designated by the controller 20, as in the case where of the supply of the latch signal in the step S103.

Meanwhile, similarly in the step S105, the controller 20 reads, from the flash memory unit 10, each logical address stored in the page corresponding to the physical address which the controller 20 itself has supplied and the physical address associated with each logical address, and the controller 20 temporarily stores the read addresses (a step S310).

Then, the controller 20 determines whether the temporarily stored logical addresses include an address which matches with the logical address which the controller 20 has stored in itself as a target whose physical address allocation needs to be changed (a step S311).

When the controller 20 determines that they include no matching address, the controller 20 advances the process to a step S313. When the controller 20 determines that they include a matching address, the controller 20 translates, among the physical addresses which the controller 20 has temporarily stored in itself, the physical address associated with the logical address determined as being the matching address into one which is to be newly associated with the logical address (a step S312), and advances the process to the step S313.

In the step S311, the logical address that the CPU 12 has supplied to the controller 20 as a data write address, for example, is determined as an address matching with the logical address which the controller 20 has stored as the target whose physical address allocation needs to be changed. Then, in the step S312, the physical address designated by the aforementioned logical address is translated from the old physical address specified by the step S202 into the new physical address specified by the step S206.

Then, this storage device performs substantially the same procedure as that of the steps S301 to S308, whereby that 1-page portion of the address translation table which the storage device has stored in itself is written in the page following that page of the memory cell array 1 which has undergone writing most lately after the start of the process shown in FIG. 10 (a step S313).

Upon completion of writing, the controller 20 determines whether the number of pages as written in the step S313 is equal to the total number of pages of the address translation table, thereby determining whether the writing of the address translation table has been completed or not (a step S314).

When it is determined that the writing of the address translation table has been completed, the process is advanced to a step S316. When it is determined that the writing of the address translation table has not yet been completed, the physical address of the next page of the address translation table is supplied to the global buffer 6, the latch signal Slatch is sent to the control circuit 5 (a step S315), and the process is returned to the step S310.

In the step S316, the controller 20 stores the locations of the empty block table and address translation table after updated.

And this storage device erases the storage contents from the logical addresses where the empty block table and the address translation table before updated are present (a step S317).

Incidentally, according to this storage device, the correspondence between the logical and physical addresses of data is written in the address translation table in the data writing order. At the time of reading the data, the correspondence between the logical and physical addresses is read while sequentially searching the address translation table. However, the following speedy method can also be employed to read the correspondence between the logical and physical addresses.

For example, using a predetermined hash function, the controller 20 may derive the location at which the correspondence between the logical and physical addresses is to be stored in the address translation table from a logical address which is sent from the CPU 12 at the data writing time, and the controller 20 may control the flash memory unit 10 so as to store the correspondence between the logical and physical addresses at the derived location. And using the aforementioned hash function also at the data- reading time, the controller 20 may derive the storage location of the correspondence between the logical and physical addresses from the logical address sent from the CPU 12, and may read the physical address from the location in the flash memory unit 10 which location has been derived by the controller 20 itself.

In this case, collision can occur at the storage location derived from the logical address sent from the CPU 12; in that case, however, the correspondence between the logical and physical addresses may be stored in the storage location next to the derived storage location, or any special area may be provided for storage in the case of collision.

As explained above, according to this storage device, the address translation table and the empty block table are stored in the memory cell array 1, and data can be read and written using those tables.

In addition, the size of each block is not limited to that described previously. For example, each block is not necessarily constituted by 16 pages, and the size of each block needs only be equal to an integer multiple of the size of each page, for example.

Furthermore, in the case where this storage device is a flash memory comprising a JEIDA/PCMCIA interface, for example, the size of each page is, in general, determined by the OS (Operating System) which is executed on the computer 11, but the size of each page may not necessarily be determined by the OS.

Moreover, in general, the size of each block is a value peculiar to this storage device, but the size of each block in this storage device can be designated by an external control.

(Second Embodiment)

In the storage device of the first embodiment, information representing the locations of empty blocks is stored concentrically in a specific area. However, the information representing the locations of the empty blocks is not necessarily stored concentrically in a specific area, and each empty block may sequentially store the information representing the location of another empty block so that the management of the empty blocks can be performed in the manner of chaining the empty blocks.

The storage device of the second embodiment, comprising the empty blocks thus chained, and a process for managing the empty blocks, will now be described with reference to FIGS. 11 to 13.

The basic structure of the storage device according to this embodiment is substantially the same as that of the storage device according to the first embodiment. In this embodiment, however, the address translation table is stored in the top area of an arbitrary blocks.

Figure 11:
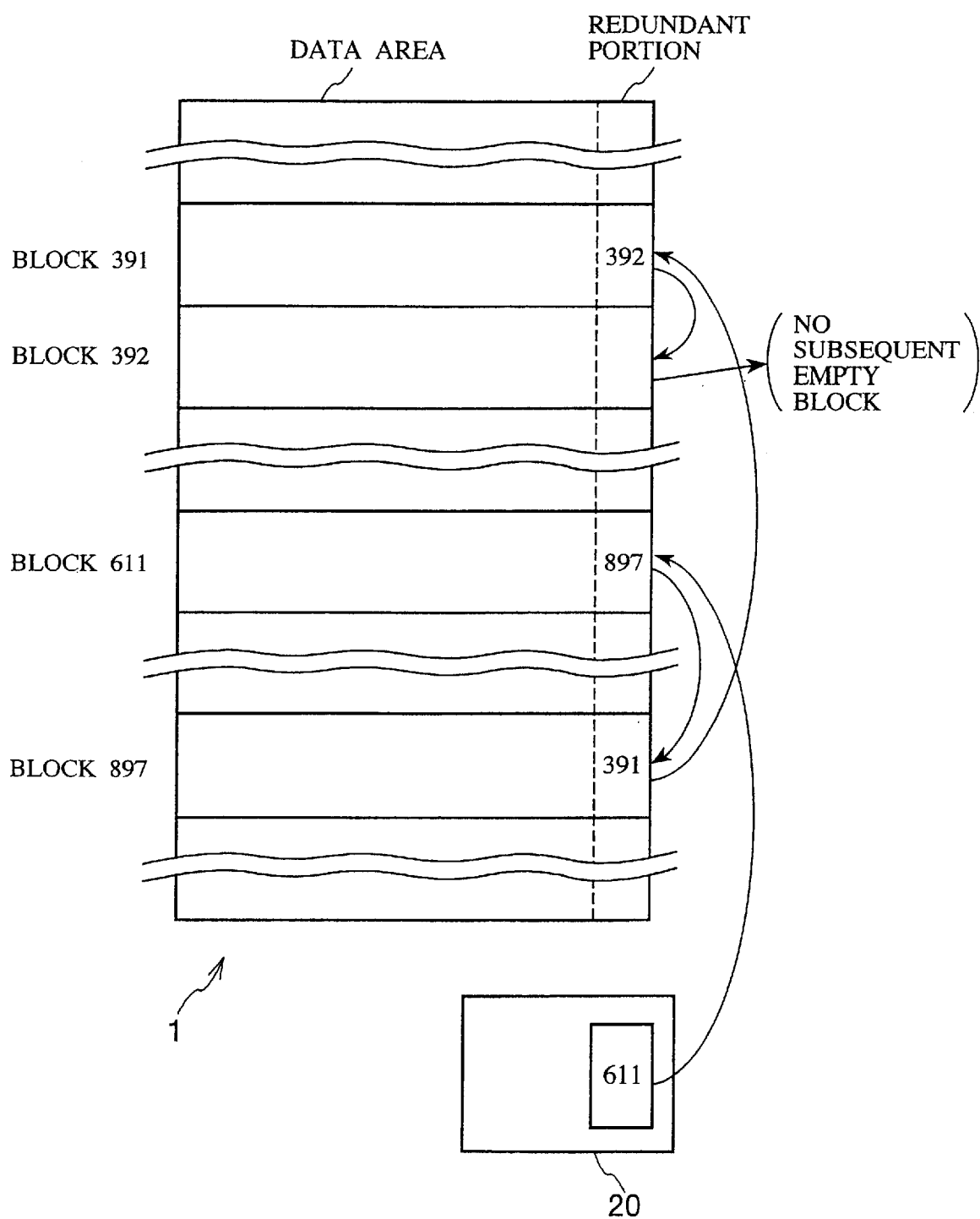
FIG. 11 is a conceptual diagram depicting a chain of empty blocks in a storage device according to the second embodiment.

Moreover, in a predetermined location within a redundant portion of each empty block, empty block information representing the number that specifies the nearest one of the empty blocks which are, logically speaking, located after t he aforementioned empty block, is stored as shown in FIG. 11.

A chain of empty blocks, which chain is defined by the empty block information, differs in order from a physical arrangement of empty blocks. Further, the control circuit 5 stores the empty block number specifying the first one of the empty blocks forming the chain. In the storage device of this embodiment, a data area and a redundant portion are arranged in each page so as not to overlap with each other as explained previously.

Due to this, even if the process of writing data in an empty block in which the empty block information has already been written is executed by simply overwriting the data, the empty block information written in the redundant portion of the aforementioned empty block is not destroyed.

(Operation of Second Embodiment)

The procedures for writing data in this storage device are the same as those of the first embodiment, except the data writing process and the process for updating the empty block information and the address translation table. Therefore, the operation of this storage device during mainly the data writing process and the process for updating the empty block information and the address translation table, will now be explained with reference to FIGS. 12 to 13.

(Data Write)

Figure 12:
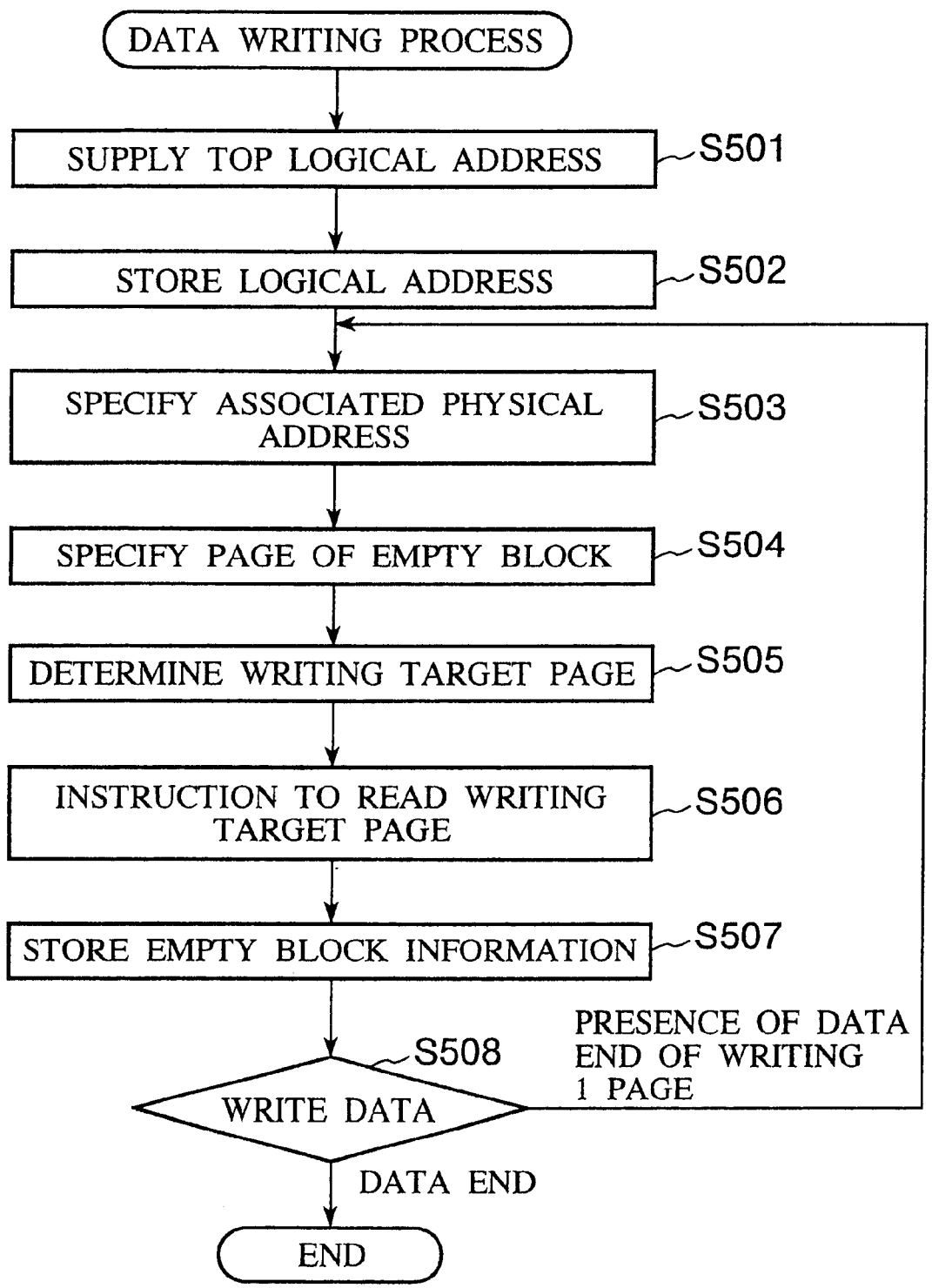
FIG. 12 is a flowchart showing a data writing process in the storage device according to the second embodiment.

The process for writing data in this storage device starts from a step 501 shown in FIG. 12.

In the step S501, the CPU 12 specifies logical write addresses, after which the CPU 12 supplies, onto the bus line 13, the value of the logical address whose number is smallest among the specified logical write addresses, and provides a data write command with the controller 20.

In response to the command supplied in the step S501, the controller 20 stores, as a logical write address, the logical address supplied from the CPU 12 through the bus line 13 (a step S502).

Subsequently, the controller 20 performs substantially the same procedure as that of the step S202 mentioned previously, thereby specifying the physical address associated with the logical write address which the controller 20 has stored in itself (a step S503).

Then, the controller 20 specifies the top page of the top empty block with reference to data which the controller 20 has stored in itself (a step S504). And the controller 20 determines to hereafter handle the physical address specified by the step S503 and a physical address belonging to the page specified by the step S504, with both physical addresses being replaced with each other (a step S505). As a result, the physical address specified by the step S504 and belonging to an empty block located at the top of the chain becomes to serve a physical write address.

Next, the controller 20 supplies the physical address determined as being the write address in the step S505 to the global buffer 6, and instructs the control circuit 5 to read the $513^{th}$ and subsequent bytes of the page designated by the aforementioned physical address (a step S506).

The control circuit 5 instructs the X address decoder 4X to select the page specified by the step S504, and thereafter sends a data read instruction to the read control terminal Treadcont of the memory cell array 1. The memory cell array 1 sequentially supplies, by 1 byte at a time, the empty block information stored in the redundant portion of the aforementioned page to the controller 20 through the I/O buffer 2 and the global buffer 6.

When the controller 20 has read the empty block information supplied from the flash memory unit 10, the controller 20 stores the empty block information as information on the location of the top empty block (a step S507). The empty block information stored in the step S507 represents the empty block which newly comes out at the top of the chain as a result of the process shown in FIG. 12.

Subsequently, this storage device performs substantially the same procedure as that of the above-described steps S211 to S217 in order to write data, while handling the physical address belonging to the page and specified as being the write address in the step S505, as the physical address specified by the step S206 of the first embodiment (a step S508).

And the controller 20 terminates the data writing process when the controller 20 determines, in the procedure which corresponds to the step S217 among the procedures carried out in the step S508, that the control code representing the end of writing has been supplied from the CPU 12.

Furthermore, when the controller 20 determines in the procedure corresponding to the step S214 that 512-byte data has been written at the currently selected page, the controller 20 sends a signal requesting the supply of the next logical address to the CPU 12, in response to which signal the CPU 12 sends the next logical address onto the bus line 13. And when the controller 20 acquires the next logical address from the CPU 12 through the bus line 13, the controller 20 stores the logical address as the logical write address, overwriting the logical address on the previously stored logical address, and returns the process to the step S503.

By the procedure of the steps S501 to S508 described above, the physical address designated by the logical write address is specified sequentially from the top of the chain of empty blocks, and data is written in the empty blocks as specified.

(Updating of Empty Block Information and Address Translation Table)

Figure 13:
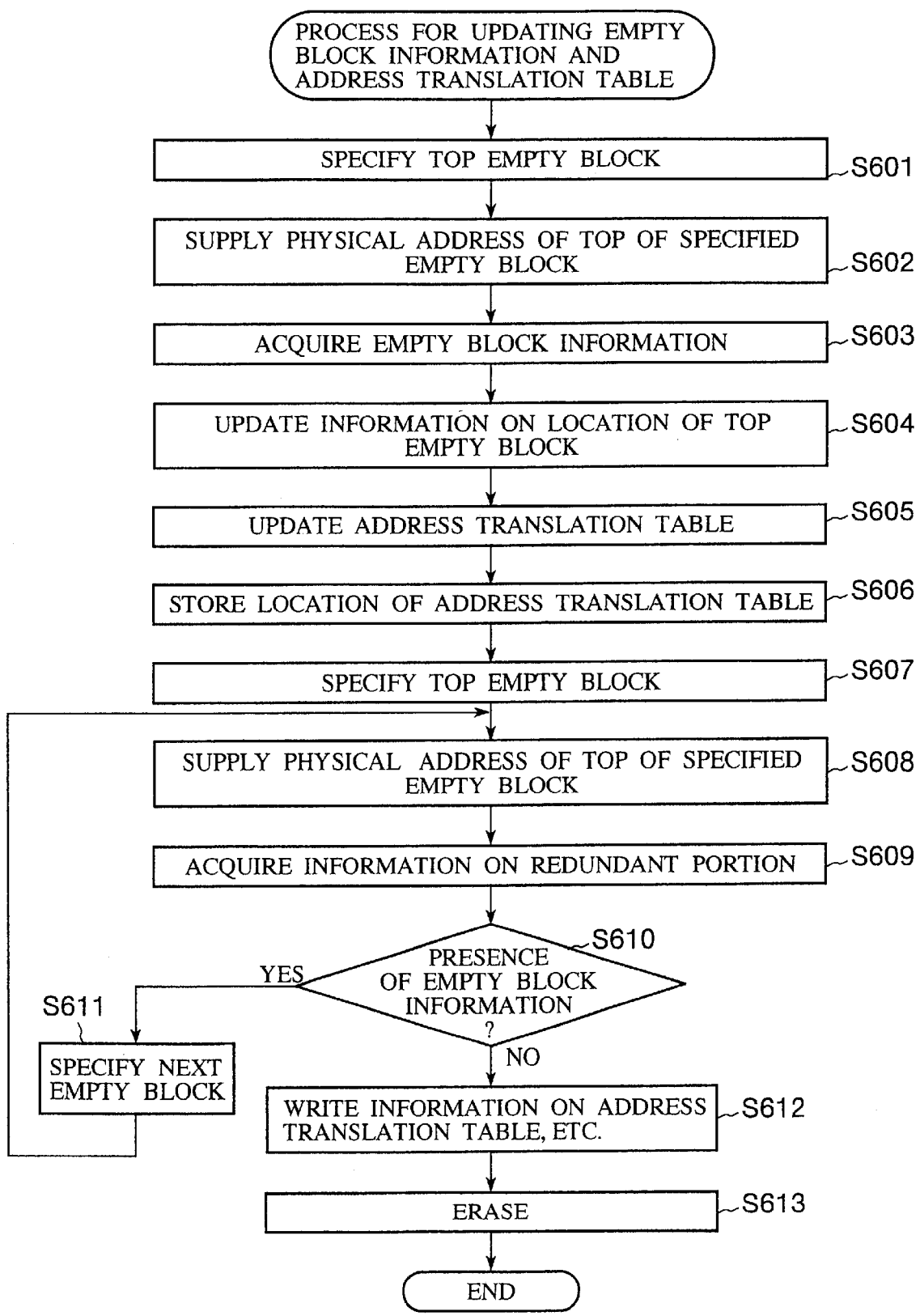
FIG. 13 is a flowchart showing a process for updating the empty block information and the address translation table in the storage device according to the second embodiment.

When updating the empty block information and the address translation table, the controller 20 initiates the process of FIG. 13 from a step S601.

In the process shown in FIG. 13, the controller 20 firstly specifies the top page of the top empty block, with reference to data which the controller 20 has stored in itself (a step S601).

Next, the controller 20 supplies the physical address of the page specified by the step S601 to the global buffer 6, and sends the latch signal Slatch to the control circuit 5 (a step S602).

In response to the latch signal Slatch, the control circuit 5 instructs the X address decoder 4X to select the page designated by the physical address supplied to the global buffer 6, and sends the data read instruction to the read control terminal Treadcont of the memory cell array 1 when the page is selected. The memory cell array 1 sequentially outputs, by 1 byte at a time, the storage contents of the aforementioned page to the controller 20 through the I/O buffer 2 and the global buffer 6.

And the controller 20 sequentially reads the 513$^{th}$ and subsequent bytes of the storage contents supplied from the global buffer 6, thereby acquiring the empty block information stored in the redundant portion of the read page (a step S603).

Having read the empty block information, the controller 20 overwrites the empty block information on information concerning the top page of the top empty block specified by the step S601. In other words, the controller 20 updates or replaces information concerning the location of the top empty block with information concerning the location of the next empty block (a step S604).

Next, the controller 20 updates the address translation table by executing the procedure of the above-described steps S309 to S315 (a step S605), and stores the location of the updated address translation table (a step S606).

However, the address translation table after updated is written in the logical address corresponding to the currently selected page specified by the step S601. Further, the information to be updated includes not only information concerning a physical block to which a new logical address has been assigned, but also information concerning the result of the physical address replacement performed in the step S505.

Next, in order to add the empty block information, the controller 20 refers to the data stored in itself and specifies the top page of the top empty block (a step S607).

Following the above, the controller 20 sends the physical address of the page which the controller 20 itself is specifying currently to the global buffer 6, and sends the latch signal Slatch to the control circuit 5 (a step S608).

In response to the latch signal Slatch, the control circuit 5 causes the X address decoder 4X to select the page designated by the physical address supplied to the global buffer 6, and sends the data read instruction to the read control terminal Treadcont of the memory cell array 1 so as to cause the memory cell array 1 to send the storage contents of the aforementioned page to the controller 20 through the I/O buffer 2 and the global buffer 6.

Then, the controller 20 sequentially reads the 513$^{th}$ and subsequent bytes of information supplied from the global buffer 6, thereby acquiring information stored in the redundant portion of the aforementioned page (a step S609).

Next, the controller 20 determines whether the empty block information is contained in the information read by the step S609 (a step S610).

When the empty block information is contained therein, the controller 20 specifies the top page of the next empty block designated by the empty block information (a step S611), and returns the process to the step S608.

When no block information is contained therein, the currently specified page is the top page of the last empty block.

At that time, the controller 20 conducts substantially the same procedure as that of the above-described steps S301 to S308, and controls the flash memory unit 10 so that data including information on the block whose first to 512$^{th}$ bytes are empty and whose 513$^{th}$ and subsequent bytes currently store, as the empty block information, the old address translation table before updated, is written in the currently selected page (a step S612).

By so doing, the block in which the old address translation block is stored currently is incorporated into the end of the chain of empty blocks.

Subsequently, this storage device erases the storage contents of the block which contains the address translation table before updated, in accordance with the same procedure as that of the above-described steps S221 to S227 (a step S613). As a result, the block in which the old address translation block has been stored becomes an empty block.

By the procedure of the steps S601 to S613 described above, the empty block information and the address translation table are updated.

In addition, when initializing the memory cell array 1, the controller 20 erases the contents of all blocks of the memory cell array 1 once, and thereafter controls the flash memory unit 10 so as to write empty block chain information in the redundant portion of each block.

In this case, the controller 20 writes the chain information so that the empty blocks are chained randomly as shown in FIG. 11. If data writing locations are distributed by thus designing the chain information, the situation in which data is repeatedly written in a specific area only can be prevented.

In addition, this invention is not limited to the above-described embodiments, and various modifications and applications are possible.

For example, according to the above embodiments, in order to facilitate understanding, data is transferred in units of 1 byte between the CPU 12 and the storage device. However, data can be transferred in arbitrary units such as 2 bytes, 4 bytes, etc. Similarly, the capacity of the memory cells is not limited to 1 byte and may be 2 bytes or else.

Furthermore, the memory cell array 1 used in the storage devices of the above-described embodiments is one chip only. However, this invention can be applied also to a storage device comprising plural-chip flash memories. In this case, the address translation table (and the empty block table) may be stored in any one block of one of the plural-chip flash memories; furthermore, the controller 20 may store information concerning the chip having the address translation table (and the empty block table) stored therein. Moreover, in the case where the empty block information is structured as the chain information as in the case of the second embodiment, the chain information which indicates the chip having the next empty block and the block number may be written in a redundant area.

Further, according to the above embodiments, the memory cell array 1 is NAND type. However, it may be NOR type.

Moreover, according to the above embodiments, the control circuit 5 is arranged within the storage device. However, access to the memory cell array 1 can be controlled without the use of the control circuit 5 by causing the controller 20 and/or the CPU 12 to perform the operations which the control circuit 5 executes. Access to the memory cell array 1 can also be controlled without the use of the controller 20 by causing the CPU 12 to perform the operations which the controller 20 executes.

In the case where the CPU 12 executes the operations of the control circuit 5 and controller 20, a program for executing the above-described control operations is installed into the computer 11 from a medium (a floppy disk, a CD-ROM or the like) containing the program stored therein, and the program is run on an OS (Operating System) to execute the above-described processes.

According to this invention, as explained above, information representing the locations of the empty blocks and information showing the correspondence between the logical and physical addresses, etc. are stored in a block erase type storage medium. This eliminates the need to provide any other storage medium for storing the information representing the locations of the empty blocks and the information showing the correspondence between the logical and physical addresses.

What is claimed is:

1. A storage device comprising:
    a non-volatile semiconductor memory including a plurality of memory blocks to which physical addresses have been assigned;
    an erasure for batch erasing of stored data from said memory in units of memory blocks; and
    a writer, to which data and logical addresses are input, which determines locations where said data is to be stored in said memory and which writes said data in said locations;
    wherein said memory stores an address translation table which stores information showing a correspondence between said logical addresses and physical addresses of said memory,
    wherein said writer adds, to said address translation table, information showing a correspondence between physical addresses of the locations where said data has been written and the input logical addresses, or updates said address translation table, and
    wherein the data and the address translation table are both stored in said memory,
    said storage device further comprising a reader that performs the following steps:
        storing a physical address of a block in which said address translation table has been written;
        accessing the block which contains said address translation table stored therein and reading physical addresses corresponding to logical addresses of to-be-read data; and
        reading and outputting data stored at the physical addresses read by said reader,
    wherein said memory stores an empty block table which stores information specifying empty blocks containing no data stored therein;
    said writer comprises empty block selector which accesses a block which contains said empty block table stored therein and selects a writing target block from the empty blocks registered in said empty block table, and empty block writer which writes to-be-written data in the empty block selected by said empty block selector,
    said storage device further comprising:
        an eliminator which eliminates said empty block table which stores information specifying said empty block that existed until said empty block writer has written said data in said empty block; and
        an empty block updater which causes said memory to store said empty block table which stores information specifying empty blocks that remain after said empty block writer has written said data in said empty block.

2. The storage device according to claim 1, wherein said memory stores said address translation table and said empty block table in one block.

3. A storage device comprising:
    a non-volatile semiconductor memory including a plurality of memory blocks to which physical addresses have been assigned;
    an erasure for batch erasing of stored data from said memory in units of memory blocks; and
    a writer, to which data and logical addresses are input, which determines locations where said data is to be stored in said memory and which writes said data in said locations;
    wherein said memory stores an address translation table which stores information showing a correspondence between said logical addresses and physical addresses of said memory,
    wherein said writer adds, to said address translation table, information showing a correspondence between physical addresses of the locations where said data has been written and the input logical addresses, or updates said address translation table, and
    wherein the data and the address translation table are both stored in said memory,
    wherein said memory stores an empty block table which stores information specifying empty blocks containing no data stored therein; and
    said writer comprises empty block selector which accesses a block which contains said empty block table stored therein and which selects a writing target block from the empty blocks registered in said empty block table, and empty block writer which writes to-be-written data in the empty block selected by said empty block selector,
    said storage device further comprising:
        an eliminator which eliminates said empty block table which stores information specifying said empty block that existed until said empty block writer has written said data in said empty block; and
an empty block updator which causes said memory to store said empty block table which stores information specifying empty blocks that remain after said empty block writer has written said data in said empty block.

4. The storage device according to claim 3, wherein said memory stores said address translation table and said empty block table in one block.

5. A storage device comprising:
a non-volatile semiconductor memory, including a plurality of memory blocks to which physical addresses have been assigned;
an erasure which erases stored data from said memory in units of memory blocks; and
a writer, to which to-be-written data and logical addresses are input, which determines locations where said data is to be stored in said memory and writes said data in said locations;
wherein said memory stores empty block information specifying empty blocks in which said data is not stored, and
wherein said writer writes said data in an empty block specified by said empty block information,
wherein said writer further comprises an updater which causes the empty block information stored in said storage means to the empty block information which specifies information on empty blocks that remain after said writer has written said data in said empty block,
wherein:
said empty block information is stored in a portion of each empty block, and includes chain information registered to specify another empty block in a chain manner; and
said writer detects an empty block in accordance with said chain information and writes said data in said empty block.

6. The storage device according to claim 5, wherein said memory has data areas and redundant areas, and said chain information is stored in said redundant areas.

7. A storage device comprising:
a non-volatile semiconductor memory, including a plurality of memory blocks to which physical addresses have been assigned;
an erasure which erases stored data from said memory in units of memory blocks; and
a writer, to which to-be-written data and logical addresses are input, which determines locations where said data is to be stored in said memory and writes said data in said locations;
wherein said memory stores empty block information specifying empty blocks in which said data is not stored, and
wherein said writer writes said data in an empty block specified by said empty block information,
wherein said writer further comprises an updater which causes the empty block information stored in said storage means to the empty block information which specifies information on empty blocks that remain after said writer has written said data in said empty block,
wherein:
said empty block information is stored in a portion of each empty block, and includes chain information registered to specify another empty block in a chain manner; and
said writer comprises top empty block storage which stores a physical address of a first empty block in a chain defined by said chain information, and a second writer writes said data in the empty block having said physical address assigned thereto and causes said top empty block storage to store the chain information registered in said block.

8. The storage device according to claim 7, wherein said memory has data areas and redundant areas, and said chain information is stored in said redundant areas.

9. A storage device comprising:
a non-volatile semiconductor memory, including a plurality of memory blocks to which physical addresses have been assigned;
an erasure which erases stored data from said memory in units of memory blocks; and
a writer, to which to-be-written data and logical addresses are input, which determines locations where said data is to be stored in said memory and writes said data in said locations;
wherein said memory stores empty block information specifying empty blocks in which said data is not stored, and
wherein said writer writes said data in an empty block specified by said empty block information,
wherein:
said empty block information is stored in a portion of each empty block, and includes chain information registered to specify another empty block in a chain manner; and
said writer detects an empty block in accordance with said chain information and writes said data in said empty block.

10. The storage device according to claim 9, wherein said memory has data areas and redundant areas, and said chain information is stored in said redundant areas.

11. A storage device comprising:
a non-volatile semiconductor memory, including a plurality of memory blocks to which physical addresses have been assigned;
an erasure which erases stored data from said memory in units of memory blocks; and
a writer, to which to-be-written data and logical addresses are input, which determines locations where said data is to be stored in said memory and writes said data in said locations;
wherein said memory stores empty block information specifying empty blocks in which said data is not stored, and
wherein said writer writes said data in an empty block specified by said empty block information,
wherein:
said empty block information is stored in a portion of each empty block, and includes chain information registered to specify another empty block in a chain manner; and
said writer comprises top empty block storage which stores a physical address of a first empty block in a chain defined by said chain information, and a second writer which writes said data in the empty block having said physical address assigned thereto and causes said top empty block storage to store the chain information registered in said block.

12. The storage device according to claim 11, wherein said memory has data areas and redundant areas, and said chain information is stored in said redundant areas.

13. A storage device comprising:
storage means, including a plurality of memory blocks to which physical addresses have been assigned;
erasure means for batch erasing of stored data from said storage means in units of memory blocks; and
writing means, to which data and logical addresses are input, for determining locations where said data is to be stored in said storage means and for writing said data in said locations;
wherein said storage means stores an address translation table which stores information showing a correspondence between said logical addresses and physical addresses of said storage means,
said writing means comprises means for adding, to said address translation table, information showing a correspondence between physical addresses of the locations where said data has been written and the input logical addresses, or for updating said address translation table, and
reading means including: means for storing a physical address of a block in which said address translation table has been written; physical address reading means for accessing the block which contains said address translation table stored therein and for reading physical addresses corresponding to logical addresses of to-be-read data; and means for reading and outputting data stored at the physical addresses read by said physical address reading means;
said storage means storing an empty block table which stores information specifying empty blocks containing no data stored therein;
said writing means comprising empty block selecting means for accessing a block which contains said empty block table stored therein and for selecting a writing target block from the empty blocks registered in said empty block table, and empty block writing means for writing to-be-written data in the empty block selected by said empty block selecting means; and
the storage device further comprising: means for eliminating said empty block table which stores information specifying said empty block that existed until said empty block writing means has written said data in said empty block; and empty block updating means, comprising means for causing said storage means to store said empty block table which stores information specifying empty blocks that remain after said empty block writing means has written said data in said empty block.

14. The storage device according to claim 13, wherein said storage means stores said address translation table and said empty block table in one block.

15. A storage device comprising:
storage means, including a plurality of memory blocks to which physical addresses have been assigned;
erasure means for batch erasing of stored data from said storage means in units of memory blocks; and
writing means, to which data and logical addresses are input, for determining locations where said data is to be stored in said storage means and for writing said data in said locations;
wherein said storage means stores an address translation table which stores information showing a correspondence between said logical addresses and physical addresses of said storage means, and
said writing means comprises means for adding, to said address translation table, information showing a correspondence between physical addresses of the locations where said data has been written and the input logical addresses, or for updating said address translation table;
wherein:
said storage means stores an empty block table which stores information specifying empty blocks containing no data stored therein; and
said writing means comprises empty block selecting means for accessing a block which contains said empty block table stored therein and for selecting a writing target block from the empty blocks registered in said empty block table, and empty block writing means for writing to-be-written data in the empty block selected by said empty block selecting means; and
the storage device further comprising: means for eliminating said empty block table which stores information specifying said empty block that existed until said empty block writing means has written said data in said empty block; and empty block updating means, comprising means for causing said storage means to store said empty block table which stores information specifying empty blocks that remain after said empty block writing means has written said data in said empty block.

16. The storage device according to claim 15, wherein said storage means stores said address translation table and said empty block table in one block.

17. A storage device comprising:
storage means, including a plurality of memory blocks to which physical addresses have been assigned;
erasure means for batch erasing of stored data from said storage means in units of memory blocks; and
writing means, to which to-be-written data and logical addresses are input, for determining locations where said data is to be stored in said storage means and for writing said data in said locations;
wherein said storage means stores empty block information specifying empty blocks in which said data is not stored, and
said writing means writes said data in an empty block specified by said empty block information;
wherein:
said writing means further comprises updating means for changing the empty block information stored in said storage means to the empty block information which specifies information on empty blocks that remain after said writing means has written said data in said empty block;
said empty block information is stored in a portion of each empty block, and includes chain information registered to specify another empty block in a chain manner; and
said writing means comprises means for detecting an empty block in accordance with said chain information and for writing said data in said empty block.

18. The storage device according to claim 17, wherein said storage means has data areas and redundant areas, and said chain information is stored in said redundant areas.

19. The storage device according to claim 17, wherein:
said empty block information is stored in a portion of each empty block, and includes chain information registered to specify another empty block in a chain manner; and
said writing means comprises top empty block storing means for storing a physical address of a first empty block in a chain defined by said chain information, and means for writing said data in the empty block having said physical address assigned thereto and for causing said top empty block storing means to store the chain information registered in said block.

20. The storage device according to claim 19, wherein said storage means has data areas and redundant areas, and said chain information is stored in said redundant areas.

21. The storage device according to claim 17, wherein:
said empty block information is stored in a portion of each empty block, and includes chain information registered to specify another empty block in a chain manner; and
said writing means comprises means for detecting an empty block in accordance with said chain information and for writing said data in said empty block.

22. The storage device according to claim 21, wherein said storage means has data areas and redundant areas, and said chain information is stored in said redundant areas.

23. The storage device according to claim 17, wherein:
said empty block information is stored in a portion of each empty block, and includes chain information registered to specify another empty block in a chain manner; and
said writing means comprises top empty block storing means for storing a physical address of a first empty block in a chain defined by said chain information, and means for writing said data in the empty block having said physical address assigned thereto and for causing said top empty block storing means to store the chain information registered in said block.

24. The storage device according to claim 23, wherein said storage means has data areas and redundant areas, and said chain information is stored in said redundant areas.

25. The storage device according to claim 13, wherein each of said blocks includes a plurality of memory pages, each of memory pages includes memory cells, and data can be read from and written into the memory cells of each of the pages in sequence.

26. The storage device according to claim 15, wherein each of said blocks includes a plurality of memory pages, each of memory pages includes memory cells, and data can be read from and written into the memory cells of each of the pages in sequence.

27. The storage device according to claim 17, wherein each of said blocks includes a plurality of memory pages, each of memory pages includes memory cells, and data can be read from and written into the memory cells of each of the pages in sequence.

* * * * *